(12) United States Patent
Hayashi

(10) Patent No.: US 11,310,852 B2
(45) Date of Patent: Apr. 19, 2022

(54) APPARATUS AND METHOD RELATED TO DUAL CONNECTIVITY

(71) Applicant: NEC CORPORATION, Tokyo (JP)

(72) Inventor: Sadafuku Hayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/747,810

(22) PCT Filed: Aug. 4, 2016

(86) PCT No.: PCT/JP2016/072902
§ 371 (c)(1),
(2) Date: Jan. 26, 2018

(87) PCT Pub. No.: WO2017/026366
PCT Pub. Date: Feb. 16, 2017

(65) Prior Publication Data
US 2018/0220483 A1   Aug. 2, 2018

(30) Foreign Application Priority Data
Aug. 11, 2015  (JP) .............................. JP2015-159142

(51) Int. Cl.
*H04W 76/15* (2018.01)
*H04W 16/32* (2009.01)
(Continued)

(52) U.S. Cl.
CPC ........... *H04W 76/15* (2018.02); *H04W 16/32* (2013.01); *H04W 36/0027* (2013.01);
(Continued)

(58) Field of Classification Search
CPC combination set(s) only.
See application file for complete search history.

(56) References Cited

U.S. PATENT DOCUMENTS 10,805,904 B2 * 10/2020 Uchino ................ H04L 41/0813
2011/0116427 A1   5/2011 Chang et al.
(Continued)

FOREIGN PATENT DOCUMENTS

CN   102469554 A   5/2012
CN   104219787 A   12/2014
(Continued)

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 13)", 3GPP TS 36.413 V13.0.0, Jun. 2015, pp. 1-302.

(Continued)

*Primary Examiner* — Yee F Lam
(74) *Attorney, Agent, or Firm* — Sughrue Mion, PLLC

(57) ABSTRACT

An apparatus and a method which make it possible to suppress occurrence of an unnecessary operation in a case of an SCG bearer. The apparatus includes: a communication processing unit configured to communicate with a terminal apparatus over a Master Cell Group (MCG) bearer for dual connectivity of the terminal apparatus; a request unit configured to request a secondary base station, which communicates with the terminal apparatus over a Secondary Cell Group (SCG) bearer for the dual connectivity, to report activity-related information related to an activity of the terminal apparatus in an SCG of the secondary base station; and an information acquisition unit configured to acquire the activity-related information reported by the secondary base station.

20 Claims, 15 Drawing Sheets

| IE/Group Name | Presence | Range | IE type and reference | Semantics description | Criticality | Assigned Criticality |
|---|---|---|---|---|---|---|
| ... | ... | ... | ... | ... | ... | ... |
| Report Characteristics | O | | ENUMERATED (User inactivity Status, Arriving data rate, ...) | | YES | reject |
| Report Characteristics Type | O | | 9.2.x2 | | YES | ignore |
| Expected UE Behaviour | C-ifRepCharacInactivity | | 9.2.70 | | YES | ignore |
| User Inactivity Timer | O | | INTEGER (0 .. 255) | The value represent second. Value "0" or "255" means infinite | YES | ignore |

(51) Int. Cl.
*H04W 92/20* (2009.01)
*H04W 76/30* (2018.01)
*H04W 36/00* (2009.01)
*H04W 88/08* (2009.01)

(52) U.S. Cl.
CPC ........... *H04W 76/30* (2018.02); *H04W 92/20* (2013.01); *H04W 88/08* (2013.01)

(56) References Cited

U.S. PATENT DOCUMENTS

| | | | |
|---|---|---|---|
| 2015/0043492 A1 | 2/2015 | Baek et al. | |
| 2015/0045052 A1 | 2/2015 | Pao et al. | |
| 2015/0146599 A1 | 5/2015 | Jha et al. | |
| 2015/0223089 A1 | 8/2015 | Chakraborty et al. | |
| 2015/0351139 A1 | 12/2015 | Zhang et al. | |
| 2016/0007352 A1* | 1/2016 | Qu ........................ | H04W 76/38 370/329 |
| 2016/0007403 A1 | 1/2016 | Futaki et al. | |
| 2016/0212760 A1 | 7/2016 | Iwai | |
| 2016/0219603 A1 | 7/2016 | Fujishiro et al. | |
| 2016/0219604 A1* | 7/2016 | Fujishiro ............... | H04W 36/04 |
| 2016/0337841 A1* | 11/2016 | Won ........................ | H04W 8/04 |
| 2016/0337925 A1* | 11/2016 | Fujishiro ........... | H04W 36/0058 |
| 2016/0373972 A1* | 12/2016 | Vesely ............... | H04W 36/0027 |
| 2017/0055169 A1 | 2/2017 | Ogura | |
| 2017/0064769 A1* | 3/2017 | Zhang ................... | H04W 76/38 |
| 2017/0195935 A1* | 7/2017 | Xu ........................ | H04W 36/30 |
| 2017/0215078 A1 | 7/2017 | Mochizuki et al. | |
| 2018/0014347 A1* | 1/2018 | Nagasaka ............... | H04W 8/22 |
| 2018/0020502 A1* | 1/2018 | Fujishiro .............. | H04L 5/0096 |
| 2018/0249417 A1* | 8/2018 | Fujishiro ........... | H04W 36/0088 |
| 2018/0295670 A1* | 10/2018 | Decarreau ............. | H04W 76/38 |

FOREIGN PATENT DOCUMENTS

| | | |
|---|---|---|
| CN | 104822169 A | 8/2015 |
| CN | 104936175 A | 9/2015 |
| CN | 104936183 A | 9/2015 |
| KR | 20150035358 A | 4/2015 |
| WO | 2014132560 A1 | 9/2014 |
| WO | 2015/115573 A1 | 8/2015 |
| WO | WO-2015115573 A1 * | 8/2015 .......... H04W 72/085 |

OTHER PUBLICATIONS

3rd Generation Partnership Project; Technical Specification Group Radio Access Network; Evolved Universal Terrestrial Radio Access Network (E-UTRAN); Extension of dual connectivity in E-UTRAN (Release 13), 3GPP TR 36.875 V13.0.0 Jun. 2015, pp. 1-38.
"Text Proposals for handling user inactivity in dual connectivity release13", Alcatel-Lucent, Alcatel-Lucent Shanghai Bell, 3GPP TSG-RAN WG3 Meeting #88, R3-151312, May 25-29, 2015, Fukuoka, Japan.
"Response to R3-151023 & R3-151024", Ericsson, 3GPP TSG-RAN WG3 Meeting #88, R3-151179, May 25-29, 2015, Fukuoka, Japan.
"User Inactivity in SCG bearer option", NEC, 3GPP TSG-RAN WG3 #89, R3-151488, Aug. 24-28, 2015, Beijing, China.
International Search Report for PCT/JP2016/072902, dated Oct. 25, 2016.
Nokia Networks et al., "SeNB initiated SCG Change procedure", 3GPP TSG-RAN WG3 Meeting #86 R3-142734, 3GPP, Nov. 17, 2014, 5 pages.
International Search Report dated Dec. 13, 2016 issued by the International Searching Authority in PCT/JP2016/078649.
Communication dated Dec. 11, 2018 from the Japanese Patent Office in application No. 2017-544464.
Non-Final Office Action dated May 31, 2019 issued by the United States Patent and Trademark Office in U.S. Appl. No. 15/759,596.
Communication dated Feb. 18, 2019 from the European Patent Office in application No. 16835063.5.
NEC: "UE-AMBR Coordination for LTE Dual Connectivity", 3GPP TSG RAN WG3 Meeting RAN3#87bis; R3-150610, Apr. 20-24, 2015, XP050937228, pp. 1-5.
Alcatel-Lucent, et al.: "Handling of user inactivity in dual connectivity release 13", 3GPP TSG-RAN, WG3 Meeting #88, R3-151023, May 25-29, 2015, XP050969412, 2 pages.
Communication dated Mar. 27, 2019 from the European Patent Office in application No. 16853471.7.
Notification of Reasons for Refusal dated Mar. 19, 2019 from the Japanese Patent Office in application No. 2017-534395.
Ericsson: "Completion of basic signalling flows", 3GPP TSG-RAN WG3 Meeting #83bis, R3-140813, 2014, XP050795503, pp. 1-19.
Ericsson: "Deriving X2AP and S1AP signalling elements", 3GPP TSG-RAN WG3 Meeting #83bis, R3-140815, 2014, XP050795505, pp. 1-6.
Alcatel-Lucent, et al.: "Need of a cause value for user inactivity in dual connectivity?", 3GPP TSG-RAN WG3 Meeting #87, R3-150202, 2015, XP050936955, 3 pages.
NTT DOCOMO, et al.: "Introduction of Dual Connectivity", 3GPP TSG-RAN WG2 #85, R2-140906, 2014, XP050770936, 46 pages.
Alcatel-Lucent, et al.: "Handling of user inactivity in Dual Connectivity", 3GPP TSG-RAN WG3 Meeting #87, R3-150203, 2015, pp. 2-31/E (30 pages).
Written Opinion dated Oct. 25, 2016 issued by the International Searching Authority in PCT/JP2016/072902.
Huawei, "Discussion on the enhancement for UE-AMBR", 3GPP TSG-RAN3 Meeting #87bis, R3-150573, Apr. 20-24, 2015, ( 4 pages total).
Alcatel-Lucent, "Text Proposals for handling user inactivity in dual connectivity release 13", 3GPP TSG-RAN WG3 Meeting #88, R3-151024, May 25-29, 2015, ( 4 pages total).
Communication dated Aug. 28, 2019, from the European Patent Office in application No. 16835063.5.
Non-Final Office Action dated Mar. 9, 2020 from the United States Patent and Trademark Office in U.S. Appl. No. 15/759,596.
Japanese Notice of Allowance for JP Application No. 2019-200781 dated Feb. 2, 2021 with English Translation.
Chinese Office Action for CN Application No. 201680058305.5 dated Jul. 19, 2021 with English Translation.
Chinese Office Action for CN Application No. 201680047159.6 dated May 6, 2021 with English Translation.
Alcatel-Lucent, Alcatel-Lucent Shanghai Bell, "Handling of user inactivity in dual connectivity release 13", 3GPP TSG-RAN WG3 Meeting #88, R3-151023, May 15, 2015, Japan.
NEC, "UE-AMBR Coordination for LTE Dual Connectivity", 3GPP TSG RAN WG3 Meeting RAN3#87bis, R3-150610, Apr. 10, 2015, Spain, pp. 1-6.
Non-Final Office Action dated Feb. 28, 2022 from the United States Patent and Trademark Office in U.S. Appl. No. 17/099,138.

* cited by examiner

| IE/Group Name | Presence | Range | IE type and reference | Semantics description |
|---|---|---|---|---|
| User Inactivity Status | O | | ENUMERATED (Active, Inactive, ...) | Indicates the user has been active or inactive |

| IE/Group Name | Presence | Range | IE type and reference | Semantics description |
|---|---|---|---|---|
| CHOICE Report Characteristics Type | M | | | |
| >On Demand | | | NULL | |
| >Periodic | | | 9.2.x4 | |
| >Event Trigger | | | 9.2.x5 | |

| IE/Group Name | Presence | Range | IE type and reference | Semantics description |
|---|---|---|---|---|
| CHOICE Information Report Periodicity Scale | M | | | |
| >hour | | | | |
| >>Report Periodicity Value | M | | INTEGER (1..24, ...) | |
| >minute | | | | |
| >>Report Periodicity Value | M | | INTEGER (1..60, ...) | |
| >second | | | | |
| >>Report Periodicity Value | M | | INTEGER (1..60, ...) | |

Figure 8

| IE/Group Name | Presence | Range | IE type and reference | Semantics description |
|---|---|---|---|---|
| User Inactivity | | | NULL | The SeNB report the User Inactivity Status if this is indicated. |
| Arriving Data Rate | | | | |
| >Report Threshold | M | | ENUMERATED (above SeNB UE-AMBR, below SeNB UE-AMBR, ...) | |

Figure 9

| IE/Group Name | Presence | Range | IE type and reference | Semantics description | Criticality | Assigned Criticality |
|---|---|---|---|---|---|---|
| ... | ... | ... | ... | ... | ... | ... |
| Report Characteristics | O | | ENUMERATED (User inactivity Status, Arriving data rate, ...) | | YES | reject |
| Report Characteristics Type | O | | 9.2.x2 | | YES | ignore |
| Expected UE Behaviour | C-ifRepCharacInactivity | | 9.2.70 | | YES | ignore |
| User Inactivity Timer | O | | INTEGER (0 .. 255) | The value represent second. Value "0" or "255" means infinite | YES | ignore |

Figure 13

| IE/Group Name | Presence | Range | IE type and reference | Semantics description | Criticality | Assigned Criticality |
|---|---|---|---|---|---|---|
| ... | ... | ... | ... | ... | ... | ... |
| Report Characteristics | O | | BITSTRING (SIZE(32)) | Each position in the bitmap indicates object the SeNB is requested to report. First Bit = Arriving Data Rate of each E-RAB, Second Bit = User Inactivity Status. | YES | ignore |
| Report Characteristic Info | | 0..<maxnoofObjects> | | | GLOBAL | ignore |
| >Report Characteristics Type | O | | 9.2.x2 | | YES | ignore |
| >Expected UE Behaviour | C-ifRepCharacInactivity | | 9.2.70 | | YES | ignore |
| User Inactivity Timer | O | | INTEGER (0 .. 255) | The value represent second. Value "0" or "255" means infinite | YES | ignore |

Figure 14

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| Report Characteristics | O | | ENUMERATED (User inactivity Status, Arriving data rate, ...) | | YES | reject |
| Report Characteristics Type | O | | 9.2.x2 | | YES | ignore |
| Expected UE Behaviour | C-ifRepCharacInactivity | | 9.2.70 | | YES | ignore |
| User Inactivity Timer | O | | INTEGER (0 .. 255) | The value represent second. Value "0" or "255" means infinite | YES | ignore |

Figure 15

| IE/Group Name | Presence | Range | IE type and reference | Semantics description | Criticality | Assigned Criticality |
|---|---|---|---|---|---|---|
| ... | ... | ... | ... | ... | ... | ... |
| User Inactivity Status | O | | 9.2.x3 | | YES | ignore |

Figure 16

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| User Inactivity Status | O | | 9.2.x3 | | YES | ignore |

Figure 17

| IE/Group Name | Presence | Range | IE type and reference | Semantics description | Criticality | Assigned Criticality |
|---|---|---|---|---|---|---|
| ... | ... | ... | ... | ... | ... | ... |
| User Inactivity Timer | O | | INTEGER (0 .. 255) | The value represent second. Value "0" or "255" means infinite | YES | ignore |

Figure 18

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| User Inactivity Timer | O | | INTEGER (0 .. 255) | The value represent second. Value "0" or "255" means infinite | YES | ignore |

Figure 19

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| Cause | M | | 9.2.6 | | YES | ignore |

Figure 20

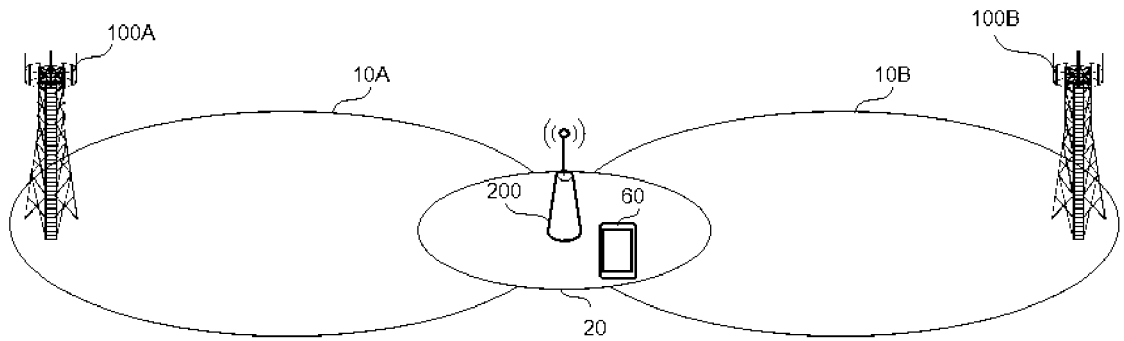

Figure 21

APPARATUS AND METHOD RELATED TO DUAL CONNECTIVITY

CROSS REFERENCE TO RELATED APPLICATIONS

This application is a National Stage of International Application No. PCT/JP2016/072902 filed Aug. 4, 2016, claiming priority based on Japanese Patent Application No. 2015-159142 filed Aug. 11, 2015, the contents of all of which are incorporated herein by reference in their entirety.

TECHNICAL FIELD

The present invention relates to an apparatus and a method related to dual connectivity.

BACKGROUND ART

A user equipment (UE) such as a smartphone often transmits and receives data for an application in the background. However, the UE does not always transmit and receive data. Therefore, an evolved Node B (eNB) monitors an activity of the UE, for example, and if there is no transmission and reception of data by the UE in a certain time period, the eNB may request a Mobility Management Entity (MME) to release the UE. For example, Non-Patent Literature 1 discloses a feature that resulting from a user inactivity, the eNB may transmit a UE CONTEXT RELEASE REQUEST to the MME.

On the other hand, in 3GPP Release 12, dual connectivity is introduced. The dual connectivity is an operation mode of a UE allowing for connection to both a Master eNB (MeNB) and a Secondary eNB (SeNB). In the dual connectivity, as for a control plane, an S1-MME is provided between the MeNB and the MME. However, the S1-MME is not provided between the SeNB and the MME. Therefore, the MeNB receives control information on a dual connectivity UE from the MME, and transmits the same to the MME. Furthermore, a user plane has two different architectures. In a first architecture, an S1-U is provided between the MeNB and a Serving Gateway (S-GW). However, the S1-U is not provided between the SeNB and the S-GW. Therefore, user plane data is not directly transmitted between the S-GW and the SeNB, but transmitted and received, via the MeNB (i.e., through the S1-U and an X2-U), between the S-GW and the SeNB. In such a first architecture, there is a bearer whose radio protocols are located in both the MeNB and the SeNB to use resources of both the MeNB and the SeNB. In this case, the bearer is referred to as a split bearer. In a second architecture, the S1-U is provided between the MeNB and the S-GW, and the S1-U is also provided between the SeNB and the S-GW. Therefore, the user plane data is directly transmitted and received between the S-GW and the SeNB, without passing through the MeNB. In such a second architecture, there is a bearer whose radio protocols are located in the SeNB to use resources of the SeNB. In this case, the bearer is referred to as a Secondary Cell Group (SCG) bearer.

In a case of the split bearer, data transmitted in an SCG (i.e., a group of serving cells related to the SeNB) passes through the MeNB, and thus, the MeNB can monitor an activity of the UE. On the other hand, in a case of the SCG bearer, data transmitted in the SCG does not pass through the MeNB, and thus, the MeNB can not directly monitor the activity of the UE and relies upon the monitoring by the SeNB. These features are disclosed in Non-Patent Literature 2.

CITATION LIST

Non Patent Literature

[NPL 1] 3GPP TS 36.413 V13.0.0 (2015-06) 3rd Generation Partnership Project; Technical Specification Group Radio Access Network (E-UTRAN); S1 Application Protocol (S1AP) (Release 13)
[NPL 2] 3GPP TR 36.875 V13.0.0 (2015-06) 3rd Generation Partnership Project; Technical Specification Group Radio Access Network (E-UTRAN); Extension of dual connectivity in E-UTRAN (Release 13)

SUMMARY OF INVENTION

Technical Problem

However, in a case of the SCG bearer as disclosed also in Non-Patent Literature 2, control related to an activity of a UE may be distributed between an MeNB and an SeNB. As a result, an unnecessary operation may occur, for example.

For example, there is a case where data of the UE is not transmitted in an SCG, but data of the UE is transmitted in a Master Cell Group (MCG) (i.e., a group of serving cells related to the MeNB). In such a case, for example, the SeNB monitors the activity of the UE in the SCG to determine a release of the SeNB resulting from an inactivity of the UE, and the SeNB may be released through a release procedure. Therefore, for example, in order to achieve data offloading to the SeNB after that, a procedure for adding the SeNB is required. That is, an unnecessary operation due to the release of the SeNB (procedure for adding the SeNB) may occur.

Furthermore, for example, the SeNB may perform, more than necessary, a monitoring of the activity of the UE in the SCG, determination of the release of the SeNB based on a result of the monitoring, and/or signalling to the MeNB (e.g., a report of the result of the monitoring or a request of the release to the MeNB). That is, an unnecessary operation (excessive operation) may occur.

An example object of the present invention is to provide an apparatus and a method which make it possible to suppress occurrence of an unnecessary operation in a case of the SCG bearer.

Solution to Problem

A first apparatus according to an example aspect of the present invention includes: a communication processing unit configured to communicate with a terminal apparatus over a Master Cell Group (MCG) bearer for dual connectivity of the terminal apparatus; a request unit configured to request a secondary base station, which communicates with the terminal apparatus over a Secondary Cell Group (SCG) bearer for the dual connectivity, to report activity-related information related to an activity of the terminal apparatus in an SCG of the secondary base station; and an information acquisition unit configured to acquire the activity-related information reported by the secondary base station.

A second apparatus according to an example aspect of the present invention includes: a communication processing unit configured to communicate with a terminal apparatus over an SCG bearer for dual connectivity of the terminal apparatus; and a reporting unit configured to report activity-related information related to an activity of the terminal apparatus in an SCG to a master base station, which communicates with the terminal apparatus over an MCG bearer of the dual connectivity, in response to a request from the master base station.

A first method according to an example aspect of the present invention includes the steps of: communicating, with a terminal apparatus over an MCG bearer for dual connectivity of the terminal apparatus; requesting a secondary base station, which communicates with the terminal apparatus over an SCG bearer for the dual connectivity, to report activity-related information related to an activity of the terminal apparatus in an SCG of the secondary base station; and acquiring the activity-related information reported by the secondary base station.

A second method according to an example aspect of the present invention includes the steps of: communicating with a terminal apparatus over an SCG bearer for dual connectivity of the terminal apparatus; and reporting activity-related information related to an activity of the terminal apparatus in an SCG to a master base station, which communicates with the terminal apparatus over an MCG bearer of the dual connectivity, in response to a request from the master base station.

Advantageous Effects of Invention

According to the present invention, it is possible to suppress occurrence of an unnecessary operation in a case of an SCG bearer. It is noted that with the present invention, instead of the above effect, or together with the above effect, other effects may be achieved.

BRIEF DESCRIPTION OF THE DRAWINGS

FIG. 8 is an explanatory diagram for explaining an example of Periodic IE.

FIG. 9 is an explanatory diagram for explaining an example of Event Trigger IE.

FIG. 13 is an explanatory diagram for explaining an example of a request message for requesting a report of activity-related information.

FIG. 14 is an explanatory diagram for explaining another example of the request message for requesting the report of the activity-related information.

FIG. 15 is an explanatory diagram for explaining an example of a UE ASSOCIATED INFORMATION REQUEST message.

FIG. 16 is an explanatory diagram for explaining an example of a report message including the activity-related information.

FIG. 17 is an explanatory diagram for explaining an example of a UE ASSOCIATED INFORMATION REPORT message.

FIG. 18 is an explanatory diagram for explaining an example of a response message on success.

FIG. 19 is an explanatory diagram for explaining an example of a UE ASSOCIATED INFORMATION RESPONSE message.

FIG. 20 is an explanatory diagram for explaining an example of a UE ASSOCIATED INFORMATION FAILURE message.

FIG. 21 is an explanatory diagram for explaining an example of a handover according to a second modification of the first example embodiment.

DESCRIPTION OF EMBODIMENTS

Figure 1:
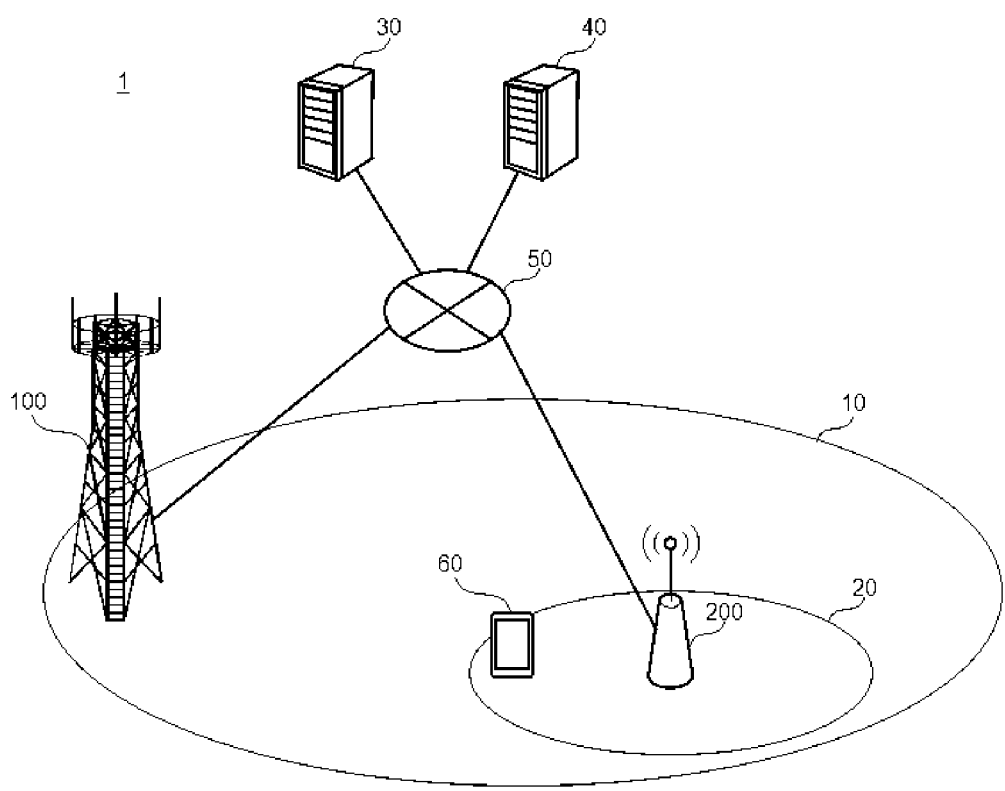
FIG. 1 is an explanatory diagram illustrating an example of a schematic configuration of a system according to an example embodiment of the present invention.

With reference to the accompanying drawings, example embodiments of the present invention will be described in detail, below. It is noted that in the specification and the drawings, like reference numerals may be assigned to like elements that can be similarly described to avoid a duplicated description.

The present invention will be described in the following order.

1. Overview of example embodiment of present invention
2. Configuration example of system
3. First example embodiment
3.1. Configuration example of first base station
3.2. Configuration example of second base station
3.3. Technical feature
3.4. First modification
3.5. Second modification
4. Second example embodiment
4.1. Configuration example of first base station
4.2. Configuration example of second base station
4.3. Technical feature 1. Overview of Example Embodiment of Present Invention First, an overview of an example embodiment of the present invention will be described.

(1) Technical Problem

In 3GPP Release 12, dual connectivity is introduced. In a case of a split bearer of the dual connectivity, data transmitted in an SCG (i.e., a group of serving cells related to an SeNB) passes through an MeNB, and thus, the MeNB can monitor an activity of a UE. On the other hand, in a case of an SCG bearer of the dual connectivity, the data transmitted in the SCG does not pass through the MeNB, and thus, the MeNB can not directly monitor the activity of the UE and relies upon the monitoring by the SeNB.

However, in a case of the SCG bearer, control related to the activity of the UE may be distributed between the MeNB and the SeNB. As a result, an unnecessary operation may occur, for example.

For example, there is a case where data of the UE is not transmitted in the SCG, but the data of the UE is transmitted in an MCG (i.e., a group of serving cells related to the MeNB). In such a case, for example, the SeNB monitors the activity of the UE in the SCG to determine a release of the SeNB resulting from an inactivity of the UE, and the SeNB may be released through a release procedure. Therefore, for example, in order to achieve data offloading to the SeNB after that, a procedure for adding the SeNB is required. That is, an unnecessary operation due to the release of the SeNB (procedure for adding the SeNB) may occur.

Furthermore, for example, the SeNB may perform, more than necessary, a monitoring of the activity of the UE in the SCG, determination of the release of the SeNB based on a result of the monitoring, and/or signalling to the MeNB (e.g., a report of the result of the monitoring or a request of the release to the MeNB). That is, an unnecessary operation (excessive operation) may occur.

(2) Technical Feature

In an example embodiment of the present invention, in order to solve the above technical problem, for example, the MeNB requests the SeNB to report activity-related information (information indicating that the UE is inactive, for example) on the activity of the UE in the SCG of the SeNB. The SeNB reports, in response to the request from the MeNB, the activity-related information to the MeNB. Then, the MeNB acquires the activity-related information.

As a result, for example, the control related to the activity of the UE is concentrated on the MeNB, and therefore, occurrence of an unnecessary operation may be suppressed in the case of the SCG bearer.

2. Configuration Example of System

Figure 2:
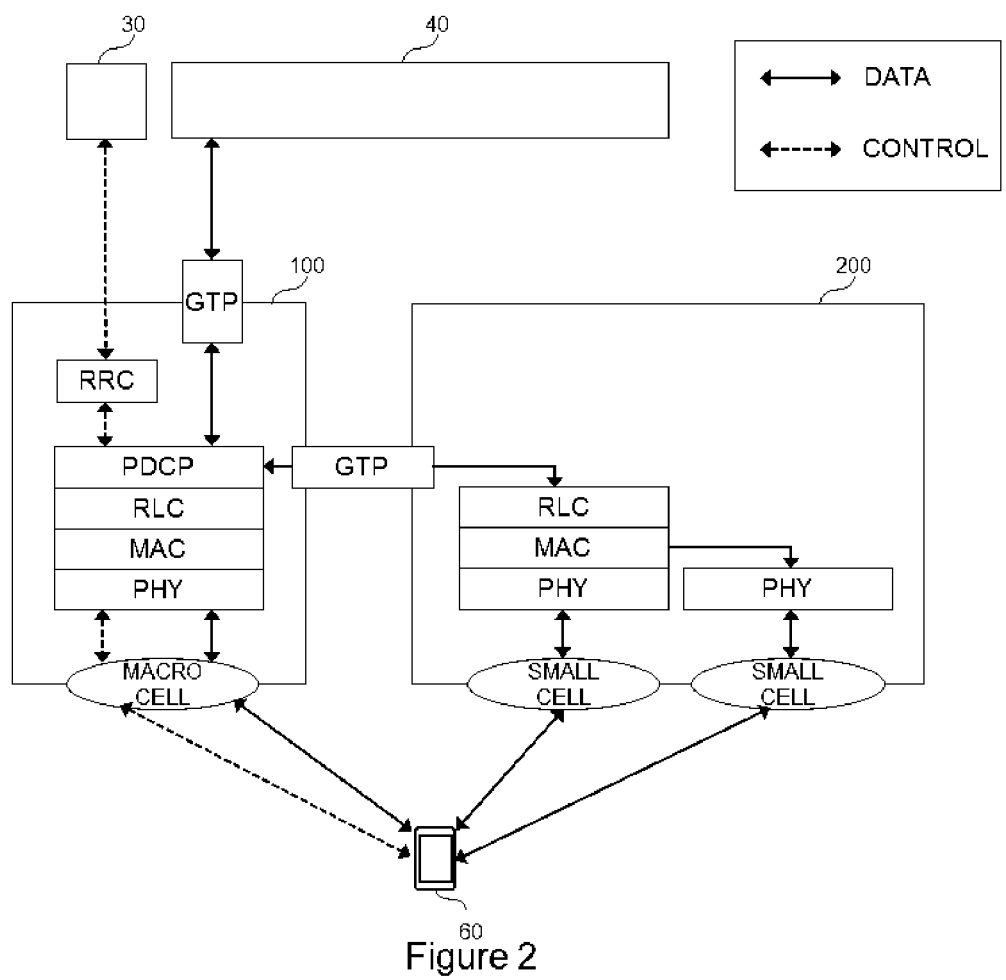
FIG. 2 is an explanatory diagram for explaining an example of a first architecture of a user plane in dual connectivity.
Figure 3:
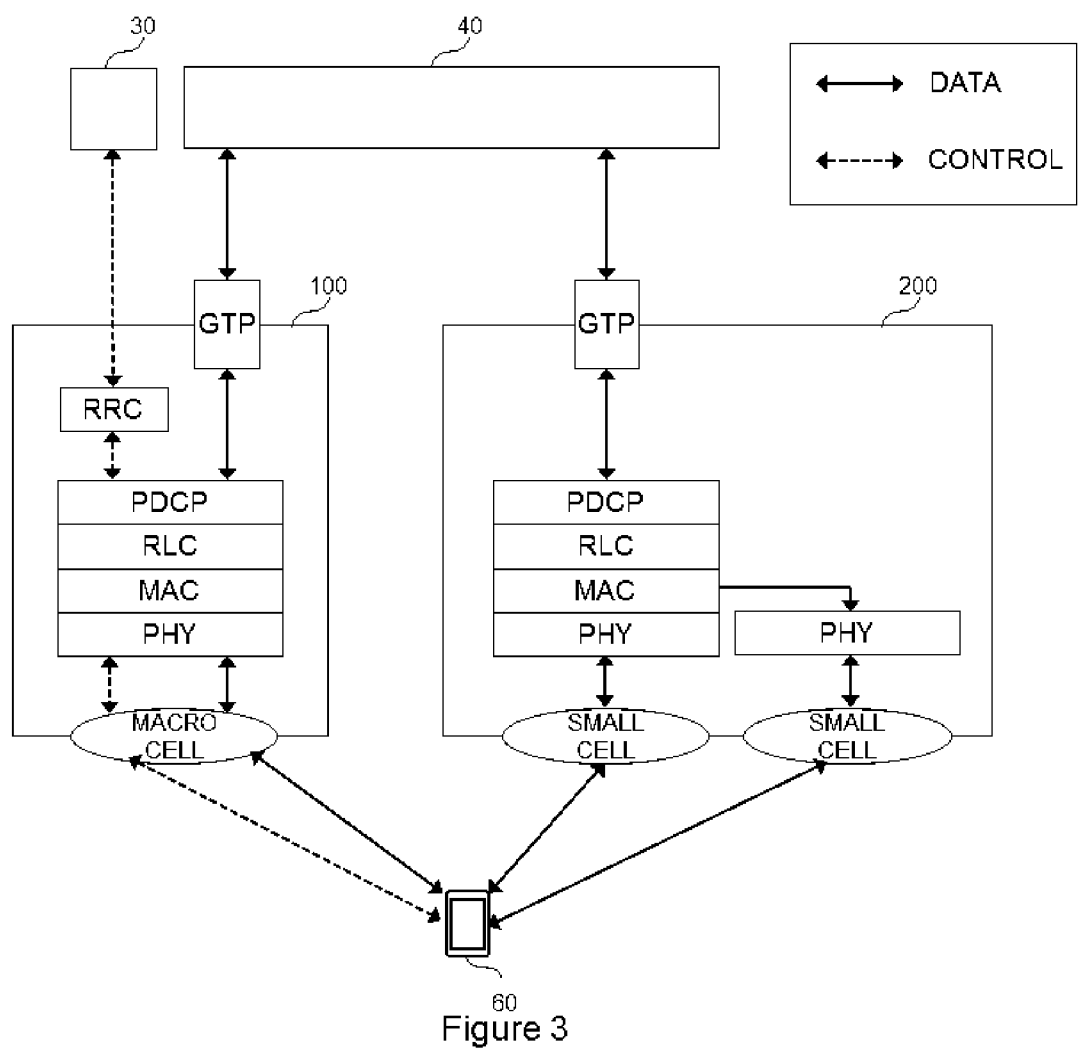
FIG. 3 is an explanatory diagram for explaining an example of a second architecture of the user plane in the dual connectivity.

With reference to FIG. 1 to FIG. 3, an example of a schematic configuration of a system 1 according to the example embodiment of the present invention will be described. FIG. 1 is an explanatory diagram illustrating the example of the schematic configuration of the system 1 according to the example embodiment of the present invention. With reference to FIG. 1, the system 1 includes a control entity 30, a gateway 40, a terminal apparatus 60, a first base station 100, and a second base station 200. The control entity 30, the gateway 40, the first base station 100, and the second base station 200 perform communication via a network 50. For example, the network 50 includes a backhaul and a core network.

For example, the system 1 may be a system that conforms to the standard of Third Generation Partnership Project (3GPP). More specifically, for example, the system 1 may be a system that conforms to Long Term Evolution (LTE)/LTE-Advanced, and/or System Architecture Evolution (SAE).

(1) Control Entity 30

The control entity 30 is a core network node, and performs control related to mobility of a terminal apparatus (e.g., the terminal apparatus 60). For example, the control entity 30 is a Mobility Management Entity (MME).

(2) Gateway 40

The gateway 40 is a core network node, and forwards data to a base station and that therefrom. For example, the gateway 40 is a Serving Gateway (S-GW).

(3) Terminal Apparatus 60

The terminal apparatus 60 performs radio communication with the base station. For example, when located within a coverage area 10 of the first base station 100, the terminal apparatus 60 performs radio communication with the first base station 100. Furthermore, for example, when located within a coverage area 20 of the second base station 200, the terminal apparatus 60 performs radio communication with the second base station 200. For example, the terminal apparatus 60 is a User Equipment (UE).

(4) First Base Station 100/Second Base Station 200

The first base station 100 is a node of a radio access network (RAN), and performs radio communication with a terminal apparatus (e.g., the terminal apparatus 60) located within the coverage area 10. The second base station 200 also is a node of the RAN, and performs radio communication with a terminal apparatus (e.g., the terminal apparatus 60) located within the coverage area 20. For example, the first base station 100 and the second base station 200 are an eNB.

For example, the coverage area 10 is a macro cell, and the first base station 100 is a base station of the macro cell. For example, the coverage area 20 is a small cell smaller than the macro cell, and the second base station 200 is a base station of the small cell.

(5) Dual Connectivity

In particular, the terminal apparatus 60 supports the dual connectivity. That is, the terminal apparatus 60 is capable of being simultaneously connected to two base stations (e.g., the first base station 100 and the second base station 200), and capable of simultaneously performing radio communication with the two base stations (e.g., the first base station 100 and the second base station 200).

Furthermore, the first base station 100 and the second base station 200 also support the dual connectivity. For example, the first base station 100 operates as a master base station in the dual connectivity, and the second base station 200 operates as a secondary base station in the dual connectivity. The master base station is a base station having an interface with the control entity 30 (base station configured to terminate the interface with the control entity 30) in the dual connectivity, and is an MeNB, for example. The secondary base station is a base station configured to provide an additional radio resource to the terminal apparatus in the dual connectivity, and is an SeNB, for example.

(a) Control Plane

In the dual connectivity, as for a control plane, an interface (e.g., an S1-MME) is provided between the master base station (e.g., the MeNB) and the control entity 30 (e.g., the MME). However, in the dual connectivity, the interface (e.g., the S1-MME) is not provided between the secondary base station (e.g., the SeNB) and the control entity 30. As a result, control information on the dual connectivity is transmitted and received between the master base station and the control entity 30.

(b) User Plane

Meanwhile, a user plane has two different architectures. With reference to FIG. 2 and FIG. 3, the two different architectures will be described, below.

FIG. 2 is an explanatory diagram for explaining an example of a first architecture of the user plane in the dual connectivity. With reference to FIG. 2, the control entity 30, the gateway 40, the terminal apparatus 60, the first base station 100, and the second base station 200 are illustrated. Here, in the dual connectivity of the terminal apparatus 60, the first base station 100 operates as a master base station, and the second base station 200 operates as a secondary base station. In the first architecture, an interface (e.g., an S1-U) is provided between the master base station (first base station 100) and the gateway 40. However, the interface (e.g., the S1-U) is not provided between the secondary base station (second base station 200) and the gateway 40. Therefore, user plane data is not directly transmitted from the gateway 40 to the secondary base station (second base station 200), but transmitted, via the master base station (first base station 100), to the secondary base station (second base station 200). In such a first architecture, there is a bearer whose radio protocols are located in both the master base station (first base station 100) and the secondary base station (second base station 200) to use resources of both the master base station (first base station 100) and the secondary base station (second base station 200). In this case, the bearer is referred to as a split bearer.

FIG. 3 is an explanatory diagram for explaining an example of a second architecture of the user plane in the dual connectivity. With reference to FIG. 3, the control entity 30, the gateway 40, the terminal apparatus 60, the first base station 100, and the second base station 200 are illustrated. Here, in the dual connectivity of the terminal apparatus 60, the first base station 100 operates as a master base station, and the second base station 200 operates as a secondary base station. In the second architecture, an interface (e.g., the S1-U) is provided between the master base station (first base station 100) and the gateway 40, and the interface (e.g., the S1-U) is also provided between the secondary base station (second base station 200) and the gateway 40. Therefore, the user plane data is directly transmitted and received between the gateway 40 and the secondary base station (second base station 200), without passing through the master base station (first base station 100). In such a second architecture, there is a bearer whose radio protocols are located in the secondary base station (second base station 200) to use resources of the secondary base station (second base station 200). In this case, the bearer is referred to as a Secondary Cell Group (SCG) bearer.

3. First Example Embodiment

Subsequently, with reference to FIG. 4 to FIG. 22, a first example embodiment of the present invention will be described.

<3.1. Configuration Example of First Base Station>

Figure 4:
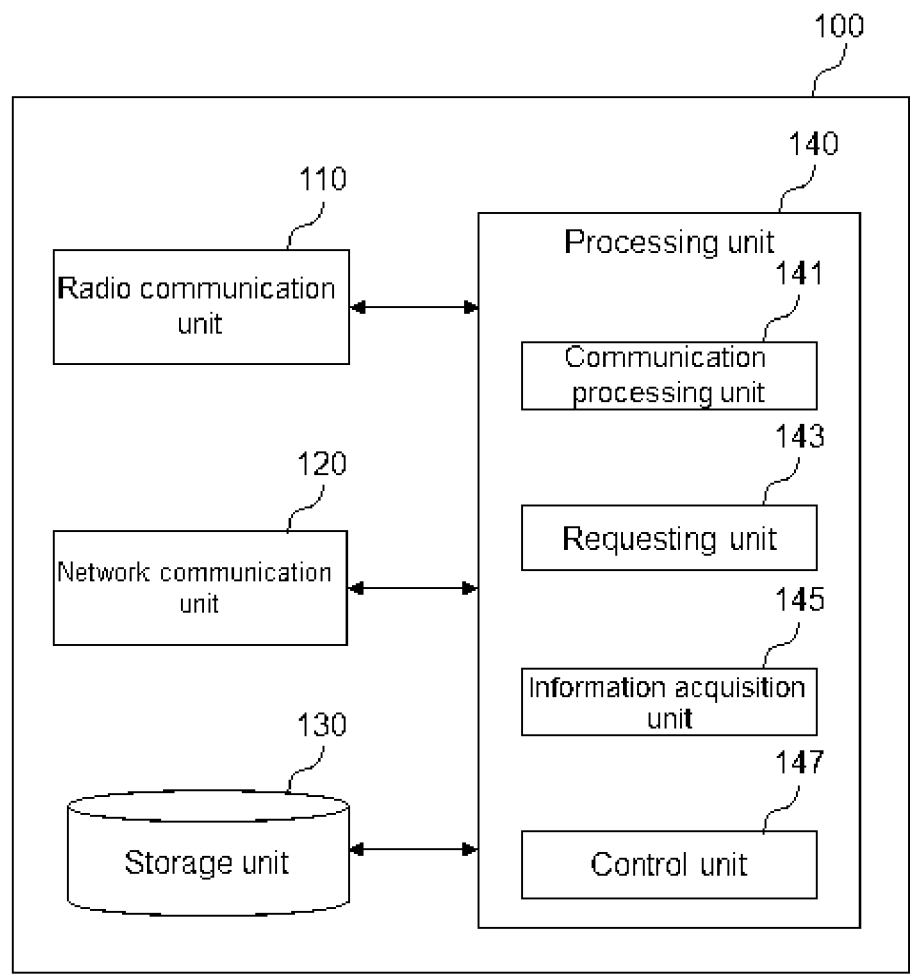
FIG. 4 is a block diagram illustrating an example of a schematic configuration of a first base station according to a first example embodiment.

First, with reference to FIG. 4, an example of a configuration of the first base station 100 according to the first example embodiment will be described. FIG. 4 is a block diagram illustrating an example of a schematic configuration of the first base station 100 according to the first example embodiment. With reference to FIG. 4, the first base station 100 includes a radio communication unit 110, a network communication unit 120, a storage unit 130, and a processing unit 140.

The radio communication unit 110 transmits and receives a signal by radio. For example, the radio communication unit 110 receives a signal from a terminal apparatus and transmits a signal to the terminal apparatus.

The network communication unit 120 receives a signal from a backhaul, and transmits a signal to the backhaul.

The storage unit 130 temporarily or permanently stores a program, a parameter, and various data for an operation of the first base station 100.

The processing unit 140 provides various functions of the first base station 100. The processing unit 140 includes a communication processing unit 141, a request unit 143, an information acquisition unit 145, and a control unit 147. It is noted that the processing unit 140 may further include other constituent components other than these constituent components. That is, the processing unit 140 may also perform an operation other than the operations of these constituent components.

Specific operations of the communication processing unit 141, the request unit 143, the information acquisition unit 145, and the control unit 147 will be described in detail later.

The radio communication unit 110 may include an antenna and a radio frequency (RF) circuit, for example. The network communication unit 120 may include a network adapter or a network interface card, for example. The storage unit 130 may include a memory (e.g., a nonvolatile memory and/or a volatile memory), and/or a hard disk, for example. The processing unit 140 may include a baseband (BB) processor and/or other processors, for example.

<3.2. Configuration Example of Second Base Station>

Figures 5, 6, 7:
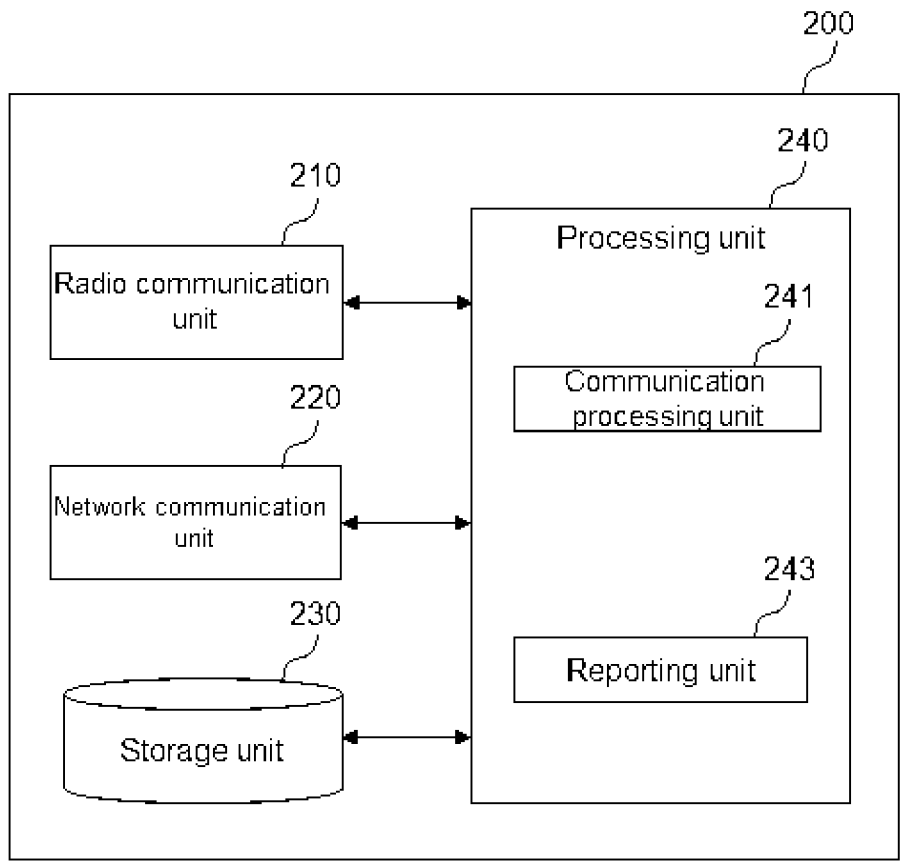
FIG. 5 is a block diagram illustrating an example of a schematic configuration of a second base station according to the first example embodiment.
FIG. 6 is an explanatory diagram for explaining an example of User Inactivity Status.
FIG. 7 is an explanatory diagram for explaining an example of Report Characteristics Type.

Next, with reference to FIG. 5, an example of a configuration of the second base station 200 according to the first example embodiment will be described. FIG. 5 is a block diagram illustrating an example of a schematic configuration of the second base station 200 according to the first example embodiment. With reference to FIG. 5, the second base station 200 includes a radio communication unit 210, a network communication unit 220, a storage unit 230, and a processing unit 240.

The radio communication unit 210 transmits and receives a signal by radio. For example, the radio communication unit 210 receives a signal from a terminal apparatus and transmits a signal to the terminal apparatus.

The network communication unit 220 receives a signal from a backhaul, and transmits a signal to the backhaul.

The storage unit 230 temporarily or permanently stores a program, a parameter, and various data for an operation of the second base station 200.

The processing unit 240 provides various functions of the second base station 200. The processing unit 240 includes a communication processing unit 241 and a reporting unit 243. It is noted that the processing unit 240 may further include other constituent components other than these constituent components. That is, the processing unit 240 may perform an operation other than the operations of these constituent components.

Specific operations of the communication processing unit 241 and the reporting unit 243 will be described in detail later.

The radio communication unit 210 may include an antenna and a radio frequency (RF) circuit, for example. The network communication unit 220 may include a network adapter or a network interface card, for example. The storage unit 230 may include a memory (e.g., a nonvolatile memory and/or a volatile memory), and/or a hard disk, for example. The processing unit 240 may include a baseband (BB) processor and/or other processors, for example.

<3.3. Technical Feature>

Next, with reference to FIG. 6 to FIG. 20, a technical feature according to the first example embodiment will be described.

(1) Dual Connectivity (Case of SCG Bearer)

For example, the first base station 100 operates as a master base station in dual connectivity of the terminal apparatus 60, and the second base station 200 operates as a secondary base station in the dual connectivity of the terminal apparatus 60. In this case, the first base station 100 (communication processing unit 141) communicates with the terminal apparatus 60 over an MCG bearer for the dual connectivity of the terminal apparatus 60, and the second base station 200 (communication processing unit 241) communicates with the terminal apparatus 60 over an SCG bearer for the dual connectivity.

For example, the communication processing unit 141 and the communication processing unit 241 perform signal processing of a PDCP layer, an RLC layer, a MAC layer, and/or a physical layer.

It is noted that the MCG bearer is a bearer whose radio protocols are located in the master base station (first base station 100) to use resources of the master base station (first base station 100). Furthermore, the SCG bearer is a bearer whose radio protocols are located in the secondary base station (second base station 200) to use resources of the secondary base station (second base station 200).

(2) Report of Activity-Related Information (a) Request for Report

The first base station 100 (request unit 143) requests the secondary base station (second base station 200), which communicates with the terminal apparatus 60 over the SCG bearer for the dual connectivity, to report activity-related information related to an activity of the terminal apparatus 60 in the SCG of the secondary base station.

For example, the first base station 100 (request unit 143) transmits a message for requesting a report of the activity-related information, to the secondary base station (second base station 200). For example, the message includes Report Characteristics, and the Report Characteristics indicates that the first base station 100 requests a feedback (i.e., a report of the activity-related information). For example, more strictly, Report Characteristics IE indicates that the first base station 100 requests a feedback from the second base station 200 when a condition provided in type information (e.g., Report Characteristics Type IE) described later is satisfied. The first base station 100 may include such Report Characteristics IE, into the message.

As an example, the first base station 100 (request unit 143) transmits an SENB ADDITION REQUEST message for requesting a report of the activity-related information, to the secondary base station (second base station 200). Alternatively, the first base station 100 (request unit 143) may transmit an SENB MODIFICATION REQUEST message for requesting a report of the activity-related information, to the secondary base station (second base station 200). By using such an existing message as described above, for example, it is possible to request a report in an existing procedure.

As another example, the first base station 100 (request unit 143) may transmit a UE-ASSOCIATED INFORMATION REQUEST message for requesting a report of the activity-related information, to the secondary base station. By using such a new message as described above, it is possible to request a report more flexibly (e.g., at a freer timing), for example.

As described above, the first base station 100 (request unit 143) requests the secondary base station (second base station 200) to report the activity-related information. As a result, the secondary base station (second base station 200) does not need to monitor and report, more than necessary, the activity of the terminal apparatus 60 in the SCG, for example. Therefore, it may be possible to suppress occurrence of an unnecessary operation in the case of the SCG bearer.

It is noted that, for example, the message for requesting a report of the activity-related information is a message dedicated to the terminal apparatus 60 (i.e., a message for each terminal apparatus). Alternatively, the message for requesting a report of the activity-related information may be a message common to a plurality of terminal apparatuses including the terminal apparatus 60. In this case, the message may include IDs of the plurality of terminal apparatuses. Each of the IDs may be a temporary ID (e.g., a Temporary Mobile Subscriber Identity (TMSI) or a Cell Radio Network Temporary Identifier (CRNTI)), or may be a permanent ID (e.g., an International Mobile Subscriber Identity (IMSI) or an International Mobile Equipment Identity (IMEI)).

(b) Reporting

The second base station 200 (reporting unit 243) reports the activity-related information to the master base station (first base station 100), which communicates with the terminal apparatus 60 on the MCG bearer of the dual connectivity, in response to a request from the master base station (first base station 100). Then, the first base station 100 (information acquisition unit 145) acquires the activity-related information reported by the secondary base station (second base station 200).

For example, when the Report Characteristics IE is included in a message (e.g., SENB ADDITION REQUEST, SENB MODIFICATION REQUEST, or UE-ASSOCIATED INFORMATION REQUEST) from the first base station 100, the second base station 200 may perform reporting (for example, when a condition indicated in type information described later (e.g., the Report Characteristics Type IE) is satisfied).

Transmission of Message

For example, the second base station 200 (reporting unit 243) transmits a message including the activity-related information to the master base station (first base station 100).

As an example, the second base station 200 (reporting unit 243) transmits an SENB MODIFICATION REQUIRED message including the activity-related information to the master base station (first base station 100). By using such an existing message as described above, for example, it is possible to perform reporting in an existing procedure.

As another example, the second base station 200 (reporting unit 243) may transmit a UE ASSOCIATED INFORMATION REPORT message including the activity-related information to the master base station (first base station 100). By using such a new message as described above, for example, it is possible to perform reporting more flexibly (e.g., at a freer timing).

Reporting Timing

As a first example, the second base station 200 (the secondary base station) reports the activity-related information to the master base station (first base station 100) after the request of the report from the first base station 100 (the master base station). Such a report may be referred to as an on-demand report.

As a second example, the second base station 200 (the secondary base station) periodically reports the activity-related information to the master base station (first base station 100). Such a report may be referred to as a periodic report.

As a third example, the second base station 200 (the secondary base station) reports the activity-related information to the master base station (first base station 100), when detecting an inactivity of the terminal apparatus 60 in the SCG (e.g., if there is no data communication of the terminal apparatus 60 in the SCG until an inactivity timer of the terminal apparatus 60 expires). Such a report may be referred to as an event trigger report.

As described above, the second base station 200 (reporting unit 243) reports the activity-related information, and the first base station 100 (information acquisition unit 145) acquires the activity-related information. As a result, for example, the master base station (first base station 100) can know the activity of the terminal apparatus 60 in the SCG, and can determine, in consideration of the activity of the terminal apparatus 60 in both the MCG and the SCG, whether to release the secondary base station (second base station 200). Thus, for example, even when the terminal apparatus 60 is inactive in the SCG, the secondary base station may not be released if the terminal apparatus 60 is active in the MCG and therefore the secondary base station is still needed. Thus, occurrence of an unnecessary operation (e.g., a procedure for adding the secondary base station) may be suppressed.

(c) Activity-Related Information
Content

For example, the activity-related information is information indicating whether the terminal apparatus 60 is active or inactive in an SCG. Alternatively, the activity-related information may simply be information indicating that the terminal apparatus 60 is inactive in an SCG.

For example, the activity-related information is User Inactivity Status. Specifically, for example, the User Inactivity Status is defined as shown in FIG. 6.

With such information, for example, the master base station (first base station 100) can know the activity of the terminal apparatus 60 even in the case of the SCG bearer.

Generation

The second base station 200 (the secondary base station) monitors the activity of the terminal apparatus 60 in the SCG (e.g., data communication of the terminal apparatus 60 in the SCG). Then, the second base station 200 (the secondary base station) generates the activity-related information based on the monitoring result.

For example, the second base station 200 (the secondary base station) monitors the activity of the terminal apparatus 60 in the SCG in response to a request for a report from the first base station 100 (the master base station). Specifically, for example, the second base station 200 may monitor the activity, when the Report Characteristics IE in a message from the first base station 100 includes the User Inactivity Status. Alternatively, the second base station 200 (the secondary base station) may voluntarily monitor the activity.

(d) Type information
Provision of Type Information

For example, the first base station 100 (request unit 143) provides the secondary base station (second base station 200) with type information indicating a type of the report when requesting the secondary base station (second base station 200) to report the activity-related information.

For example, the type information indicates, as the type of the report, on demand, event trigger, or periodic.

For example, the type information is Report Characteristics Type. Specifically, for example, the Report Characteristics Type is defined as shown in FIG. 7 and includes "On Demand" IE, "Periodic" IE, and/or "Event Trigger" IE as an information element (IE). With such IEs, the Report Characteristics Type indicates the type of the report. Furthermore, for example, the "Periodic" IE is defined as shown in FIG. 8 and includes Report Periodicity Value as information indicating a period. Moreover, the "Event Trigger" IE is defined as shown in FIG. 9 and includes "User Inactivity" IE, "Arriving Data Rate" IE, and the like as information indicating an event of the report. Thus, the type information may also indicate a report condition (in other words, the type information may also include information indicating the report condition).

Reporting Based on Type Information

For example, the second base station 200 (reporting unit 243) reports the activity-related information to the master base station (first base station 100) based on the type information provided by the master base station (first base station 100). More specifically, for example, the second base station 200 (reporting unit 243) reports the activity-related information to the master base station (first base station 100) in accordance with the type of the report indicated by the type information.

With provision of the type information and the reporting based on the type information, for example, the master base station (first base station 100) can acquire the activity-related information at a desired timing.

(e) Behaviour-Related Information
Provision of Behaviour-Related Information

For example, the first base station 100 (request unit 143) provides the secondary base station (second base station 200) with behaviour-associated information associated with a behaviour of the terminal apparatus 60 when requesting the secondary base station (second base station 200) to report the activity-related information. For example, the behaviour-related information is Expected UE Behaviour. The behaviour-related information is information provided by the control entity 30 to the first base station 100.

Thus, for example, the secondary base station (second base station 200) having no interface with the control entity 30 (e.g., the MME) also can acquire the behaviour-related information.

For example, the first base station 100 determines a value of an inactivity timer based on the behaviour-related information (e.g., the Expected UE Behaviour) acquired from the control entity 30, and sets the inactivity timer to the determined value. Furthermore, the first base station 100 (request unit 143) may provide the second base station 200 with timer information indicating the value of the inactivity timer (e.g., a User Inactivity Timer IE). Thus, for example, the first base station 100 and the second base station 200 can monitor the activity of the terminal apparatus 60 by using the same timer value.

Reporting Based on Behaviour-Related Information

For example, the second base station 200 (reporting unit 243) reports the activity-related information to the master base station (first base station 100) based on the behaviour-related information. More specifically, for example, the second base station 200 (reporting unit 243) sets the inactivity timer of the terminal apparatus 60 to an appropriate value based on the behaviour-related information. Then, the second base station 200 (reporting unit 243) reports the activity-related information to the master base station (first base station 100) when there is no data communication of the terminal apparatus 60 in the SCG until the inactivity timer expires (or when there is a small amount of data communication). It is noted that needless to say, the second base station 200 (reporting unit 243) may perform the on-demand report and/or the periodic report, together with such an event trigger report (or instead of such an event trigger report).

Thus, for example, the secondary base station (second base station 200) can perform a more appropriate reporting.

It is noted that the second base station 200 (reporting unit 243) may provide the first base station 100 with the timer information indicating the value of the inactivity timer (determined by the second base station 200) (e.g., the User Inactivity Timer IE).

(f) Flow of Processing

Figure 10:
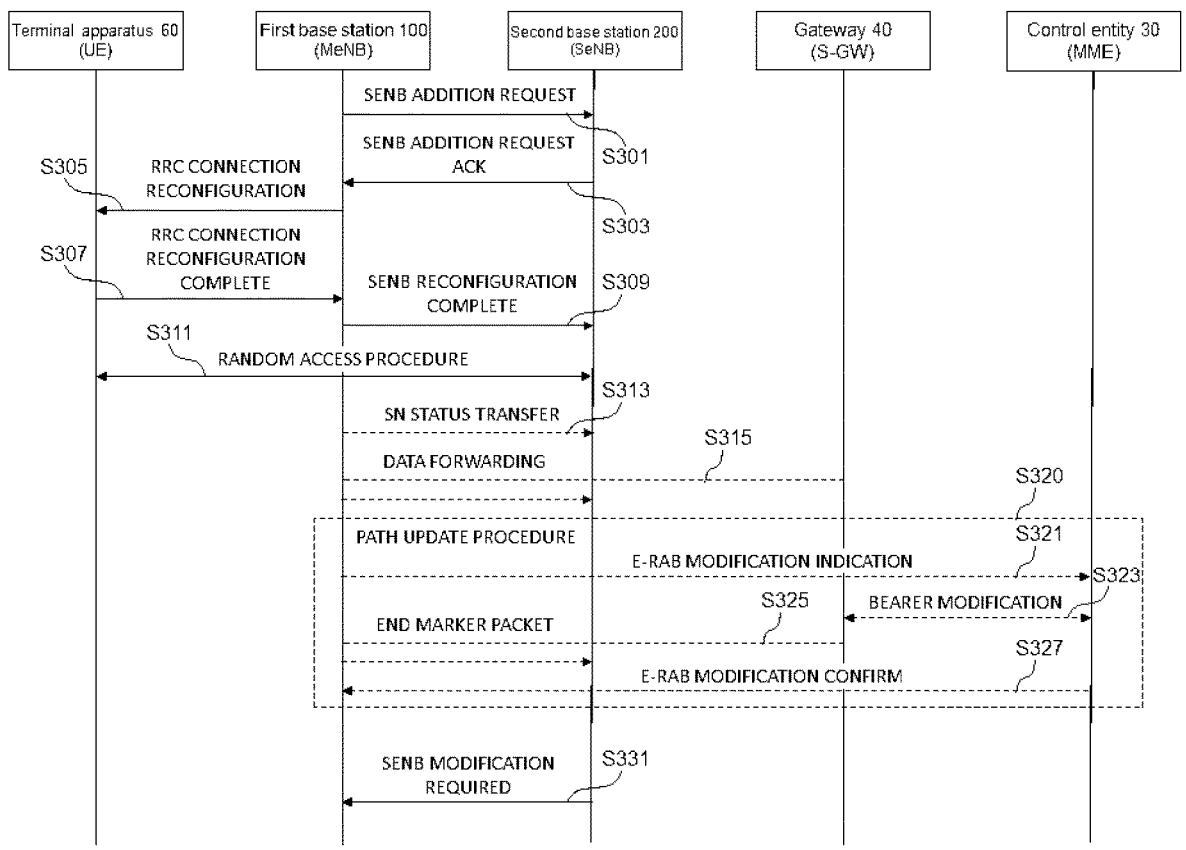
FIG. 10 is a sequence diagram illustrating a first example of a schematic flow of request and report processing according to the first example embodiment.
Figure 11:
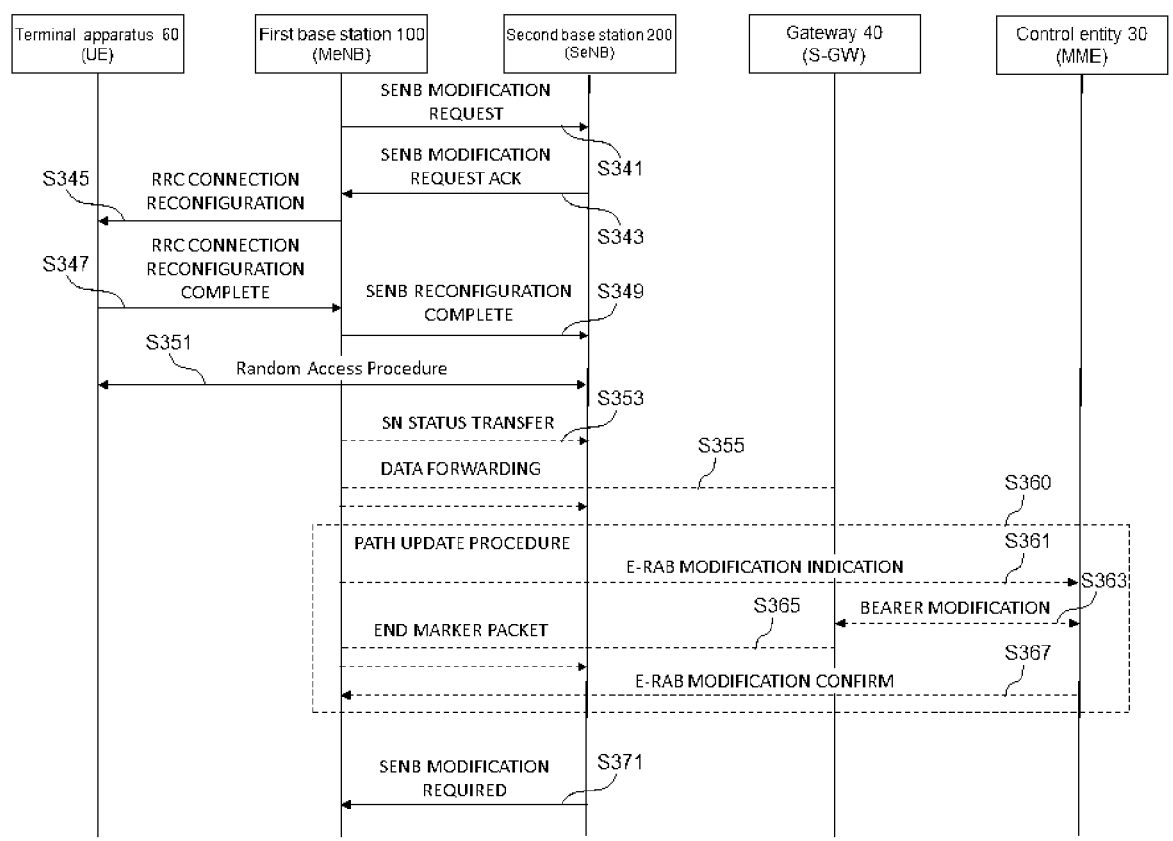
FIG. 11 is a sequence diagram illustrating a second example of the schematic flow of the request and report processing according to the first example embodiment.
Figure 12:
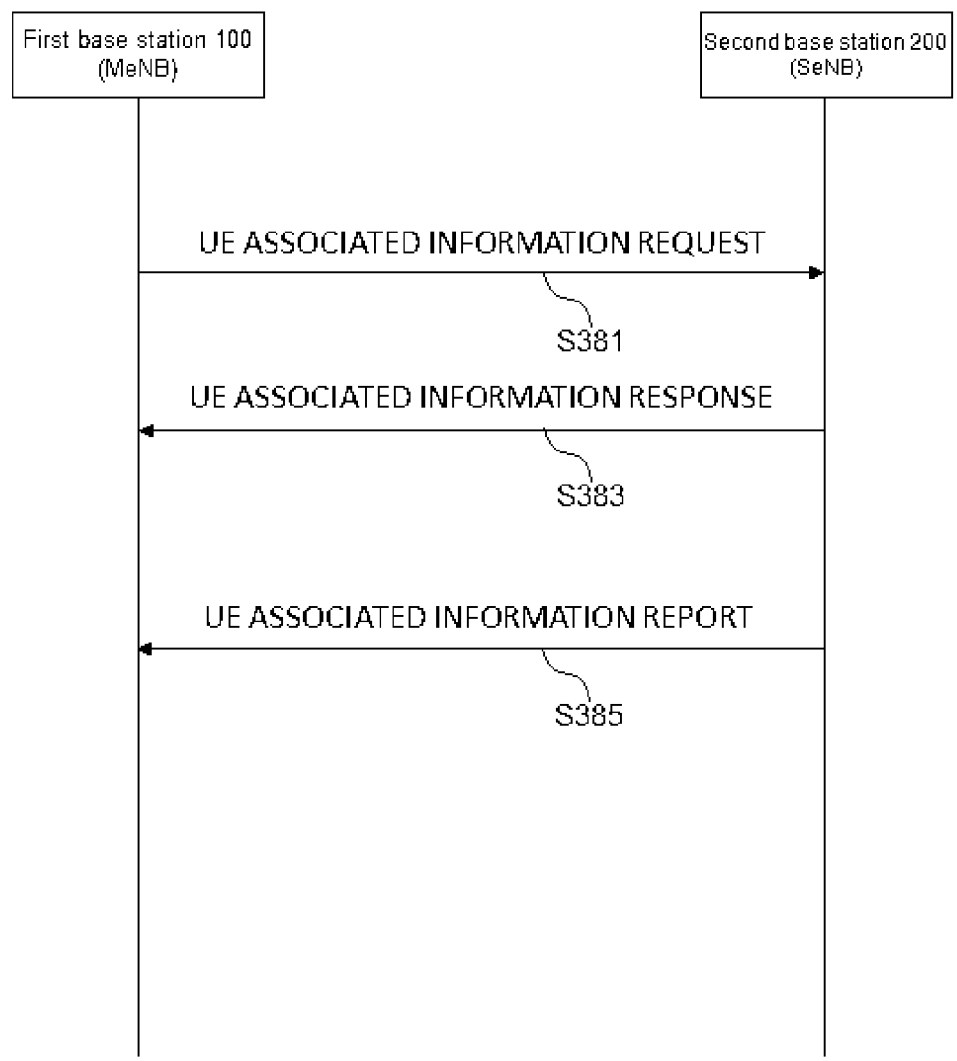
FIG. 12 is a sequence diagram illustrating a third example of the schematic flow of the request and report processing according to the first example embodiment.

With reference to FIG. 10 to FIG. 12, request and report processing according to the first example embodiment will be described.

(f-1) First Example

FIG. 10 is a sequence diagram illustrating a first example of a schematic flow of the request and report processing according to the first example embodiment.

The first base station 100 that is the MeNB transmits an SENB ADDITION REQUEST message to the second base station 200 that is the SeNB (S301). The SENB ADDITION REQUEST message includes the Report Characteristics (i.e., information indicating the reporting of the activity-related information). Thus, the first base station 100 requests the second base station 200 to report the activity-related information. Furthermore, the SENB ADDITION REQUEST message further includes the Report Characteristics Type (i.e., the type information) and the Expected UE Behaviour (i.e., the behaviour-related information). Furthermore, the SENB ADDITION REQUEST message may include User Inactivity Timer (i.e., timer information).

Then, the second base station 200 transmits an SENB ADDITION REQUEST ACKNOWLEDGMENT message to the first base station 100 (S303). The SENB ADDITION REQUEST ACKNOWLEDGMENT message may include the User Inactivity Timer (i.e., the timer information indicating the value of the inactivity timer determined by the second base station 200).

Thereafter, a reconfiguration (S305-S309) for adding the SeNB (i.e., the second base station 200) and a random access procedure (S311) are performed. Furthermore, if necessary, a data forwarding (S313, S315) and/or a path update procedure (S320) are performed.

The second base station 200 transmits an SENB MODIFICATION REQUIRED message to the first base station 100 (S331). The SENB MODIFICATION REQUIRED message includes the User Inactivity Status (i.e., the activity-related information). Thus, the second base station 200 reports the activity-related information to the first base station 100. It is noted that needless to say, the second base station 200 monitors the activity of the terminal apparatus 60 in the SCG, and generates the activity-related information based on the monitoring result. The SENB MODIFICATION REQUIRED message may further include the User Inactivity Timer (i.e., the timer information indicating the value of the inactivity timer determined by the second base station 200).

The first base station 100 receives the SENB MODIFICATION REQUIRED message and acquires the User Inactivity Status (i.e., the activity-related information). The first base station 100 may then transmit an SENB MODIFICATION CONFIRM message to the second base station 200.

It is noted that when receiving the SENB MODIFICATION REQUIRED message including a User Inactivity Status IE (i.e., the activity-related information), the first base station 100 may use the message to determine and perform any particular operation. For example, in response to the reception of the SENB MODIFICATION REQUIRED message, the first base station 100 may perform a reconfiguration for an efficient operation in the dual connectivity related to the terminal apparatus 60 (UE).

(f-2) Second Example

FIG. 11 is a sequence diagram illustrating a second example of the schematic flow of the request and report processing according to the first example embodiment.

The first base station 100 that is the MeNB transmits an SENB MODIFICATION REQUEST message to the second base station 200 that is the SeNB (S341). The SENB MODIFICATION REQUEST message includes the Report Characteristics (i.e., the information indicating the reporting of the activity-related information). Thus, the first base station 100 requests the second base station 200 to report the activity-related information related to the activity. Furthermore, the SENB MODIFICATION REQUEST message further includes the Report Characteristics Type (i.e., the type information) and the Expected UE Behaviour (i.e., the behaviour-related information). Furthermore, the SENB MODIFICATION REQUEST message may include the User Inactivity Timer (i.e., the timer information).

Then, the second base station 200 transmits an SENB MODIFICATION REQUEST ACKNOWLEDGMENT message to the first base station 100 (S343). The SENB MODIFICATION REQUEST ACKNOWLEDGMENT message may include the User Inactivity Timer (i.e., the timer information indicating the value of the inactivity timer determined by the second base station 200).

Thereafter, a reconfiguration (S345-S349) and a random access procedure (S351) related to the SeNB (i.e., the second base station 200) are performed. Furthermore, if necessary, a data forwarding (S353, S355) and/or a path update procedure (S360) are performed.

The second base station 200 transmits an SENB MODIFICATION REQUIRED message to the first base station 100 (S371). The SENB MODIFICATION REQUIRED message includes the User Inactivity Status (i.e., the activity-related information). Thus, the second base station 200 reports the activity-related information to the first base station 100. It is noted that needless to say, the second base station 200 monitors the activity of the terminal apparatus 60 in the SCG, and generates the activity-related information based on the monitoring result. The SENB MODIFICATION REQUIRED message may further include the User Inactivity Timer (i.e., the timer information indicating the value of the inactivity timer determined by the second base station 200).

The first base station 100 receives the SENB MODIFICATION REQUIRED message and acquires the User Inactivity Status (i.e., the activity-related information). The first base station 100 may then transmit an SENB MODIFICATION CONFIRM message to the second base station 200.

It is noted that when receiving the SENB MODIFICATION REQUIRED message including the User Inactivity Status IE (i.e., the activity-related information), the first base station 100 may use the message to determine and perform any particular operation. For example, in response to the reception of the SENB MODIFICATION REQUIRED message, the first base station 100 may perform a reconfiguration for an efficient operation in the dual connectivity related to the terminal apparatus 60 (UE).

(f-3) Third Example

FIG. 12 is a sequence diagram illustrating a third example of the schematic flow of the request and report processing according to the first example embodiment. This procedure uses a UE-associated signalling.

The first base station 100 that is the MeNB transmits a UE ASSOCIATED INFORMATION REQUEST message to the second base station 200 that is the SeNB (S381). The UE ASSOCIATED INFORMATION REQUEST message includes the Report Characteristics (i.e., the information indicating the reporting of the activity-related information). Thus, the first base station 100 requests the second base station 200 to report the activity-related information related to the activity. Furthermore, the UE ASSOCIATED INFORMATION REQUEST message further includes the Report Characteristics Type (i.e., the type information) and the Expected UE Behaviour (i.e., the behaviour-related information). Furthermore, the UE ASSOCIATED INFORMATION REQUEST message may include the User Inactivity Timer (i.e., the timer information).

In response to the reception of the UE ASSOCIATED INFORMATION REQUEST message, the second base station 200 may perform measurement as requested by the first base station 100. Furthermore, the second base station 200 transmits a UE ASSOCIATED INFORMATION RESPONSE message to the first base station 100 (S383). The UE ASSOCIATED INFORMATION RESPONSE message may include the User Inactivity Timer (i.e., the timer information indicating the value of the inactivity timer determined by the second base station 200).

Thereafter, the second base station 200 transmits a UE ASSOCIATED INFORMATION REPORT message to the first base station 100 (S385). The UE ASSOCIATED INFORMATION REPORT message includes the User Inactivity Status (i.e., the activity-related information). Thus, the second base station 200 reports the activity-related information to the first base station 100. Needless to say, the second base station 200 monitors the activity of the terminal apparatus 60 in the SCG, and generates the activity-related information based on the monitoring result. The UE ASSOCIATED INFORMATION REPORT message may further include the User Inactivity Timer (i.e., the timer information indicating the value of the inactivity timer determined by the second base station 200).

The first base station 100 receives the UE ASSOCIATED INFORMATION REPORT message and acquires the User Inactivity Status (i.e., the activity-related information).

It is noted that when receiving the UE ASSOCIATED INFORMATION REPORT message including the User Inactivity Status IE (i.e., the activity-related information), the first base station 100 may use the message to determine any particular operation. For example, in response to the reception of the UE ASSOCIATED INFORMATION REPORT message, the first base station 100 may perform a reconfiguration for an efficient operation in the dual connectivity related to the terminal apparatus 60 (UE).

Unsuccessful Operation

If it is not possible to start, in the second base station 200, the measurement requested as indicated in the Report Characteristics IE, the second base station 200 may transmit a UE ASSOCIATED INFORMATION FAILURE message (instead of the UE ASSOCIATED INFORMATION RESPONSE message). The message may include Cause IE to which an appropriate value is set.

Furthermore, if the second base station 200 cannot achieve a combination of the measurements requested as indicated in the Report Characteristics IE and the Report Characteristics Type IE, the second base station 200 may use the UE ASSOCIATED INFORMATION FAILURE message to reject the UE ASSOCIATED INFORMATION REQUEST. The message may include Cause IE to which an appropriate value is set.

The Cause IE may include Radio Network Layer Cause IE, and the Radio Network Layer Cause IE may be set to Requested Report Characteristic not Supported. The Requested Report Characteristic not Supported may mean that the requested Report Characteristics are not supported by a transmission node.

For example, if the second base station 200 fails to start the requested measurement, the UE ASSOCIATED INFORMATION FAILURE message is transmitted, for UE-associated information, to the first base station 100 by the second base station 200.

(g) Information Included in Message (g-1) Request Message

The SENB ADDITION REQUEST, the SENB MODIFICATION REQUEST, and the UE ASSOCIATED INFORMATION REQUEST described with reference to FIG. 10 to FIG. 12 are messages for requesting a report of the activity-related information, and include an information element (IE) as shown in FIG. 13, for example. That is, these messages include the Report Characteristics, the Report Characteristics Type, the Expected UE Behaviour (i.e., the behaviour-related information), and the User Inactivity Timer (i.e., the timer information).

The User Inactivity Timer has a value of any one of 0 to 255. It is noted that the User Inactivity Timer may mean Infinite or that the timer is not activated, when the value is a specific value (as an example, 0 or 255). The timer not being activated is equivalent to not monitoring the activity of the terminal apparatus 60.

It is noted that an example of FIG. 13 is an example of ENUMERATED where the Report Characteristics can designate only one object (e.g., the User Inactivity). Alternatively, the Report Characteristics may be, instead of the ENUMERATED, BITSTRING capable of designating a plurality of objects (e.g., the User Inactivity, and an Arriving data rate) as shown in FIG. 14. In this case, Report Characteristic Info may include the Report Characteristic type and the Expected UE Behaviour for each of the plurality of objects. With the use of the BITSTRING, for example, it is possible to request, by only one IE, a plurality of objects (e.g., the User Inactivity, and the Arriving data rate). As a result, the number of IEs may decrease.

As an example, the UE ASSOCIATED INFORMATION REQUEST message includes an information element (IE) as shown in FIG. 15. That is, the UE ASSOCIATED INFORMATION REQUEST further includes a Message Type, an MeNB UE X2AP ID, and an SeNB UE X2AP ID. It is noted that the Report Characteristics in the UE ASSOCIATED INFORMATION REQUEST message may be the BITSTRING as shown in FIG. 14, instead of the ENUMERATED.

It is noted that as described above, the first base station 100 can request, from the second base station 200, not only the report of the User Inactivity of the terminal apparatus 60, but also, for example, the report of the Arriving data rate of the terminal apparatus 60. Thus, for example, the first base station 100 can perform control not only on the data rate of the terminal apparatus 60 in the MCG but also on the data rate of the terminal apparatus 60 in the SCG. In particular, this is effective when an upper limit of the data rate of the terminal apparatus 60 is defined (by contract or the like).

(g-2) Report Message

The SENB MODIFICATION REQUIRED and the UE ASSOCIATED INFORMATION REPORT described with reference to FIG. 10 to FIG. 12 are messages including the activity-related information, and for example, include an information element (IE) as shown in FIG. 16. That is, these messages include the User Inactivity Status (i.e., the activity-related information) and the User Inactivity Timer (i.e., the timer information).

As an example, the UE ASSOCIATED INFORMATION REPORT includes an information element (IE) as shown in FIG. 17. That is, the UE ASSOCIATED INFORMATION REPORT further includes the Message Type, the MeNB UE X2AP ID, and the SeNB UE X2AP ID.

(g-3) Response Message (Success)

The SENB ADDITION REQUEST ACKNOWLEDGMENT, the SENB MODIFICATION REQUEST ACKNOWLEDGEMENT, and the UE ASSOCIATED INFORMATION RESPONSE described with reference to FIG. 10 to FIG. 12 are messages including the timer information, and for example, include an information element as shown in FIG. 18. That is, these messages include the User Inactivity Timer (i.e., the timer information). It is noted that similarly, the SENB MODIFICATION REQUIRED message may also be a message including the timer information, and for example, may include the information element (IE) as shown in FIG. 18.

As an example, the UE ASSOCIATED INFORMATION RESPONSE includes an information element (IE) as shown in FIG. 19. That is, the UE ASSOCIATED INFORMATION RESPONSE further includes the Message Type, the MeNB UE X2AP ID, and the SeNB UE X2AP ID.

(g-4) Response Message (Failure)

As described above, instead of the UE ASSOCIATED INFORMATION RESPONSE described with reference to FIG. 12, the UE ASSOCIATED INFORMATION FAILURE message may be transmitted by the second base station 200. The UE ASSOCIATED INFORMATION FAILURE message includes, for example, an information element (IE) as shown in FIG. 20.

(3) Operation Based on Activity-Related Information

For example, in response to the report of the activity-related information by the second base station 200, a reconfiguration for an efficient operation in the dual connectivity related to the terminal apparatus 60 (UE) may be performed.

More specifically, for example, when a report message from the second base station 200 includes the User Inactivity Status IE (i.e., the activity-related information), the first base station 100 may perform the reconfiguration for an efficient operation in the dual connectivity related to the terminal apparatus 60 (UE).

(a) Release of Secondary Base Station

For example, the first base station 100 (control unit 147) determines, based on the activity-related information, whether to release the secondary base station (second base station 200). As a result, for example, even in a case of the SCG bearer, control related to the activity of the terminal apparatus 60 is concentrated on the master base station.

Furthermore, for example, the first base station 100 (control unit 147) determines, further based on other activity-related information related to the activity of the terminal apparatus 60 in the MCG, whether to release the secondary base station (second base station 200). As a result, for example, even when the terminal apparatus 60 is inactive in the SCG, the secondary base station may not be released if the terminal apparatus 60 is active in the MCG and therefore the secondary base station is still needed. Thus, occurrence of an unnecessary operation (e.g., a procedure for adding the secondary base station) may be suppressed.

For example, the first base station 100 (control unit 147) determines not to release the secondary base station (second base station 200) and maintains, without releasing, the secondary base station (second base station 200). Alternatively, the first base station 100 (control unit 147) determines to release the secondary base station (second base station 200) and releases the secondary base station (second base station 200) through an SeNB release procedure.

As an example, when the UE is inactive, the first base station 100 may start a release procedure (e.g., the SeNB Release Procedure) for the second base station 200.

(b) Release of Terminal Apparatus

The first base station 100 (control unit 147) may determine, based on the activity-related information (and other activity-related information related to the activity of the terminal apparatus 60 in the MCG), whether to release the terminal apparatus 60. Then, the first base station 100 (control unit 147) may request the control entity 30 to release the terminal apparatus 60, when determining to release the terminal apparatus 60. For example, when the terminal apparatus 60 is inactive in the SCG, (i.e., the activity-related information indicates that the terminal apparatus 60 is inactive in the SCG) and when the terminal apparatus 60 is inactive also in the MCG (i.e., the other activity-related information indicates that the terminal apparatus 60 is inactive in the MCG), the first base station 100 (control unit 147) requests the control entity 30 to release the terminal apparatus 60.

(c) Addition of Bearer

The first base station 100 (control unit 147) may determine, based on the activity-related information, whether to further add a bearer related to the terminal apparatus 60 and the secondary base station (second base station 200). Then, the first base station 100 (control unit 147) determines to further add the bearer, and the bearer may be further added. The bearer may be a bearer between the gateway 40 and the terminal apparatus 60 (e.g., an E-RAB between the S-GW and the UE). Furthermore, the first base station 100 (control unit 147) may add the bearer through an SeNB Modification procedure.

<3.4. First Modification>

Next, a first modification of the first example embodiment will be described.

In the example described above, the second base station 200 (reporting unit 243) transmits the SENB MODIFICATION REQUIRED message or the UE ASSOCIATED INFORMATION REPORT message including the User Inactivity Status (i.e., the activity-related information), to the first base station 100. As a result, the second base station 200 (reporting unit 243) reports the activity-related information to the first base station 100.

Meanwhile, in the first modification of the first example embodiment, the second base station 200 (reporting unit 243) may transmit, to the first base station 100, an SENB RELEASE REQUIRED message including the Radio Network Layer Cause indicating the User Inactivity (i.e., the activity-associated information). As a result, the second base station 200 (reporting unit 243) may report the activity-related information to the first base station 100.

<3.5. Second Modification>

Next, with reference to FIG. 21 and FIG. 22, a second modification of the first example embodiment will be described.

(1) Overview

In the second modification of the first example embodiment, a handover of the terminal apparatus 60 between master base stations is performed, and the secondary base station is maintained even after the handover. In such a case, information provided by the master base station to the secondary base station at the time of requesting the report of the activity-related information is transmitted from a source master base station to a target master base station. The information includes, for example, the Report Characteristics, the Report Characteristics Type, and the User Inactivity Timer. As a result, for example, even after the handover of the master base station, it may become easy to continue to report the activity-related information.

(2) Handover

FIG. 21 is an explanatory diagram for explaining an example of a handover according to the second modification of the first example embodiment. With reference to FIG. 21, first base stations 100A and 100B, the second base station 200, and the terminal apparatus 60 are illustrated. In this example, the terminal apparatus 60 has communicated with the first base station 100A and the second base station 200 in the dual connectivity, but the terminal apparatus 60 moves from a coverage area 10A to a coverage area 10B and a handover of the terminal apparatus 60 from the first base station 100A to the first base station 100B is performed. It is noted that the terminal apparatus 60 remains within a coverage area 20.

(3) Flow of Processing

Figure 22:
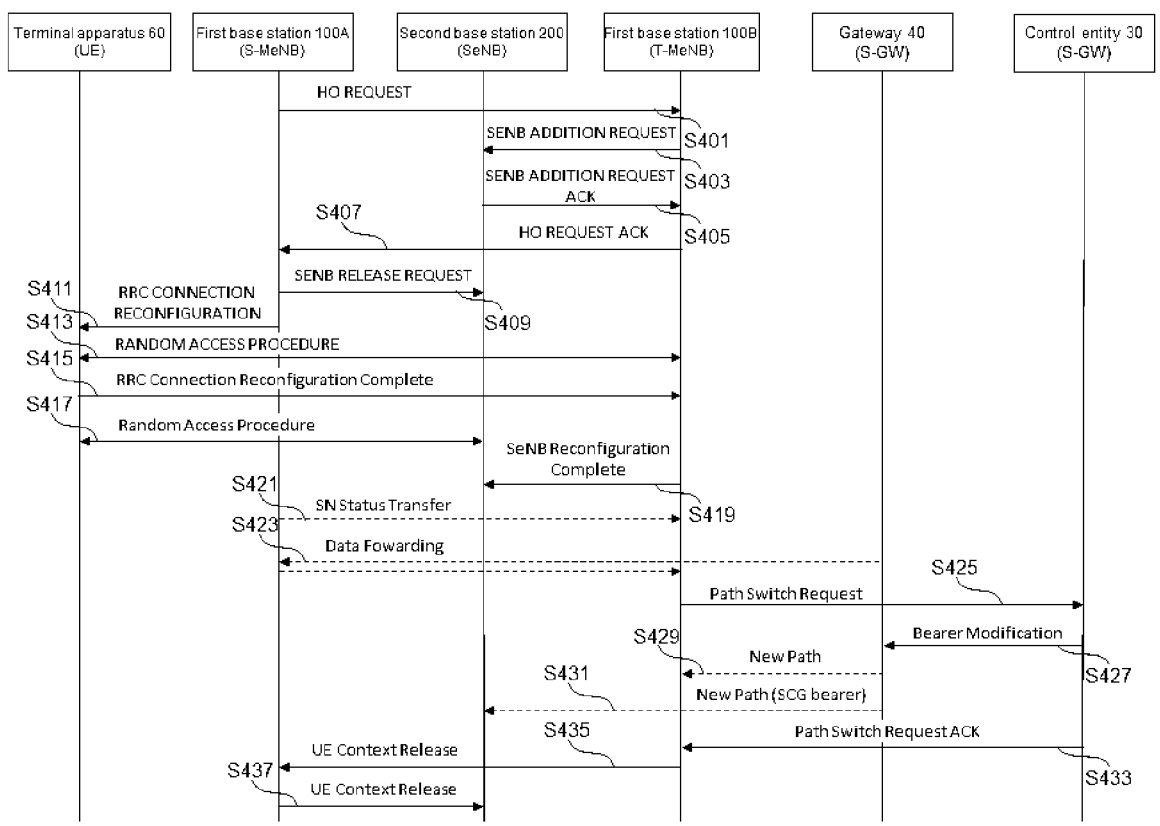
FIG. 22 is a sequence diagram illustrating an example of a schematic flow of handover processing according to the second modification of the first example embodiment.

FIG. 22 is a sequence diagram illustrating an example of a schematic flow of handover processing according to the second modification of the first example embodiment.

The first base station 100A, which is the MeNB and a source eNB of the handover, transmits a HANDOVER REQUEST message to the first base station 100B which is a target eNB of the handover (S401). The HANDOVER REQUEST message includes the Report Characteristics (i.e., the information indicating the reporting of the activity-related information) and the Report Characteristics Type (i.e., the type information).

Thereafter, processing for the handover of the terminal apparatus 60 from the first base station 100A to the first base station 100B is performed (S403-437).

4. Second Example Embodiment

Figure 23:
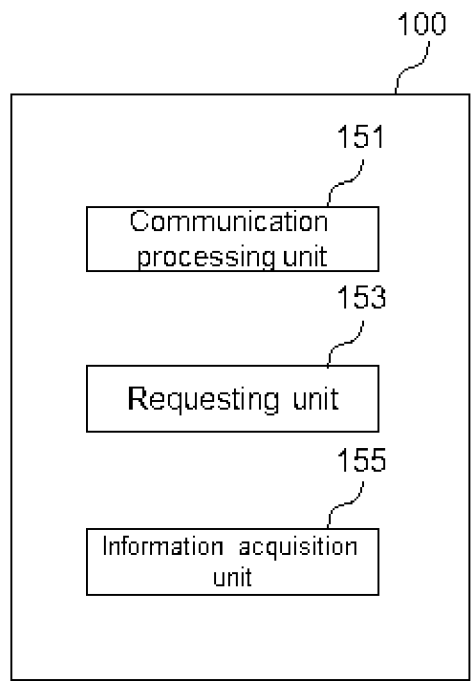
FIG. 23 is a block diagram illustrating an example of a schematic configuration of a first base station according to a second example embodiment.
Figure 24:
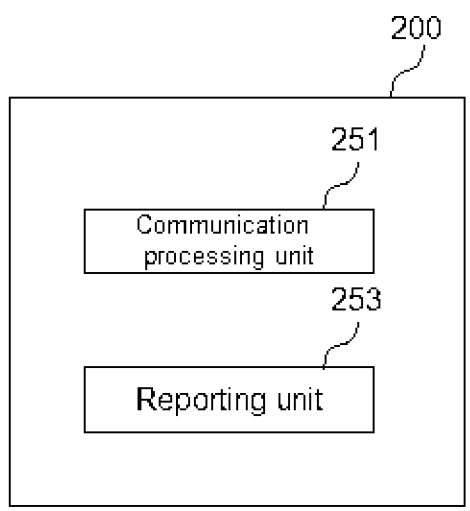
FIG. 24 is a block diagram illustrating an example of a schematic configuration of a second base station according to the second example embodiment.

Subsequently, with reference to FIG. 23 to FIG. 25, a second example embodiment of the present invention will be described.

<4.1. Configuration Example of First Base Station>

First, with reference to FIG. 23, an example of a configuration of the first base station 100 according to the second example embodiment will be described. FIG. 23 is a block diagram illustrating an example of a schematic configuration of the first base station 100 according to the second example embodiment. With reference to FIG. 23, the first base station 100 includes a communication processing unit 151, a request unit 153, and an information acquisition unit 155.

Specific operations of the communication processing unit 151, the request unit 153, and the information acquisition unit 155 will be described in detail later.

The communication processing unit 151, the request unit 153, and the information acquisition unit 155 may be implemented by way of a baseband (BB) processor and/or other processors or the like.

<4.2. Configuration Example of Second Base Station>

First, with reference to FIG. 24, an example of a configuration of the second base station 200 according to the second example embodiment will be described. FIG. 24 is a block diagram illustrating an example of a schematic configuration of the second base station 200 according to the second example embodiment. With reference to FIG. 24, the second base station 200 includes a communication processing unit 251 and a reporting unit 253.

Specific operations of the communication processing unit 251 and the reporting unit 253 will be described in detail later.

The communication processing unit 251 and the reporting unit 253 may be implemented by way of a baseband (BB) processor and/or other processors or the like.

<4.3. Technical Feature>

Next, with reference to FIG. 25, a technical feature according to the second example embodiment will be described.

(1) Dual Connectivity (Case of SCG Bearer)

For example, the first base station 100 operates as a master base station in dual connectivity of the terminal apparatus 60, and the second base station 200 operates as a secondary base station in the dual connectivity of the terminal apparatus 60. In this case, the first base station 100 (communication processing unit 151) communicates with the terminal apparatus 60 over the MCG bearer for dual connectivity of the terminal apparatus 60, and the second base station 200 (communication processing unit 251) communicates with the terminal apparatus 60 over the SCG bearer for the dual connectivity.

For example, the communication processing unit 151 and the communication processing unit 251 perform signal processing of a PDCP layer, an RLC layer, a MAC layer, and/or a physical layer.

It is noted that the MCG bearer is a bearer whose radio protocols are located in the master base station (first base station 100) to use resources of the master base station (first base station 100). Furthermore, the SCG bearer is a bearer whose radio protocols are located in the secondary base station (second base station 200) to use resources of the secondary base station (second base station 200).

(2) Report of Activity-Related Information (a) Request for Report

The first base station 100 (request unit 153) requests the secondary base station (second base station 200), which communicates with the terminal apparatus 60 over the SCG bearer for the dual connectivity, to report activity-related information related to the activity of the terminal apparatus 60 in the SCG of the secondary base station.

For example, the first base station 100 (request unit 153) transmits, to the secondary base station (second base station 200), a message for requesting a report of the activity-related information. For example, the message includes the Report Characteristics, and the Report Characteristics indicates the reporting of the activity-related information.

As described above, the first base station 100 (request unit 153) requests the secondary base station (second base station 200) to report the activity-related information. As a result, the secondary base station (second base station 200) does not need to monitor and report, more than necessary, the activity of the terminal apparatus 60 in the SCG, for example. Therefore, it may be possible to suppress occurrence of an unnecessary operation in the case of the SCG bearer.

(b) Reporting

The second base station 200 (reporting unit 253) reports the activity-associated information to the master base station (first base station 100), which communicates with the terminal apparatus 60 on the MCG bearer of the dual connectivity, in response to a request from the master base station (first base station 100). Then, the first base station 100 (information acquisition unit 155) acquires the activity-related information reported by the secondary base station (second base station 200).

Transmission of Message

For example, the second base station 200 (reporting unit 253) transmits a message including the activity-related information to the master base station (first base station 100).

Reporting Timing

As a first example, the second base station 200 (the secondary base station) reports the activity-associated information to the master base station (first base station 100) after the request of the report from the first base station 100 (the master base station).

As a second example, the second base station 200 (the secondary base station) periodically reports the activity-related information to the master base station (first base station 100).

As a third example, the second base station 200 (the secondary base station) reports the activity-related information to the master base station (first base station 100) when detecting an inactivity of the terminal apparatus 60 in the SCG (e.g., if there is no data communication of the terminal apparatus 60 in the SCG until an inactivity timer of the terminal apparatus 60 expires).

As described above, the second base station 200 (reporting unit 253) reports the activity-related information, and the first base station 100 (information acquisition unit 155) acquires the activity-related information. As a result, for example, the master base station (first base station 100) can know the activity of the terminal apparatus 60 in the SCG, and can determine, in consideration of the activity of the terminal apparatus 60 in both the MCG and the SCG, whether to release the secondary base station (second base station 200). Thus, for example, even when the terminal apparatus 60 is inactive in the SCG, the secondary base station may not be released if the terminal apparatus 60 is active in the MCG and therefore the secondary base station is still needed. Thus, occurrence of an unnecessary operation (e.g., a procedure for adding the secondary base station) may be suppressed.

(c) Activity-Related Information

Content

For example, the activity-related information is information indicating whether the terminal apparatus 60 is active or inactive in an SCG. Alternatively, the activity-related information may simply be information indicating that the terminal apparatus 60 is inactive in an SCG.

For example, the activity-related information is the User Inactivity Status. Specifically, for example, the User Inactivity Status is defined as shown in FIG. 6.

With such information, for example, the master base station (first base station 100) can know the activity of the terminal apparatus 60 even in the case of the SCG bearer.

Generation

The second base station 200 (the secondary base station) monitors the activity of the terminal apparatus 60 in the SCG (e.g., data communication of the terminal apparatus 60 in the SCG). Then, the second base station 200 (the secondary base station) generates the activity-related information based on the monitoring result.

For example, the second base station 200 (the secondary base station) starts monitoring the activity of the terminal apparatus 60 in the SCG in response to a request for a report from the first base station 100 (the master base station). Alternatively, the second base station 200 (the secondary base station) may voluntarily start the monitoring.

(d) Flow of Processing

Figure 25:
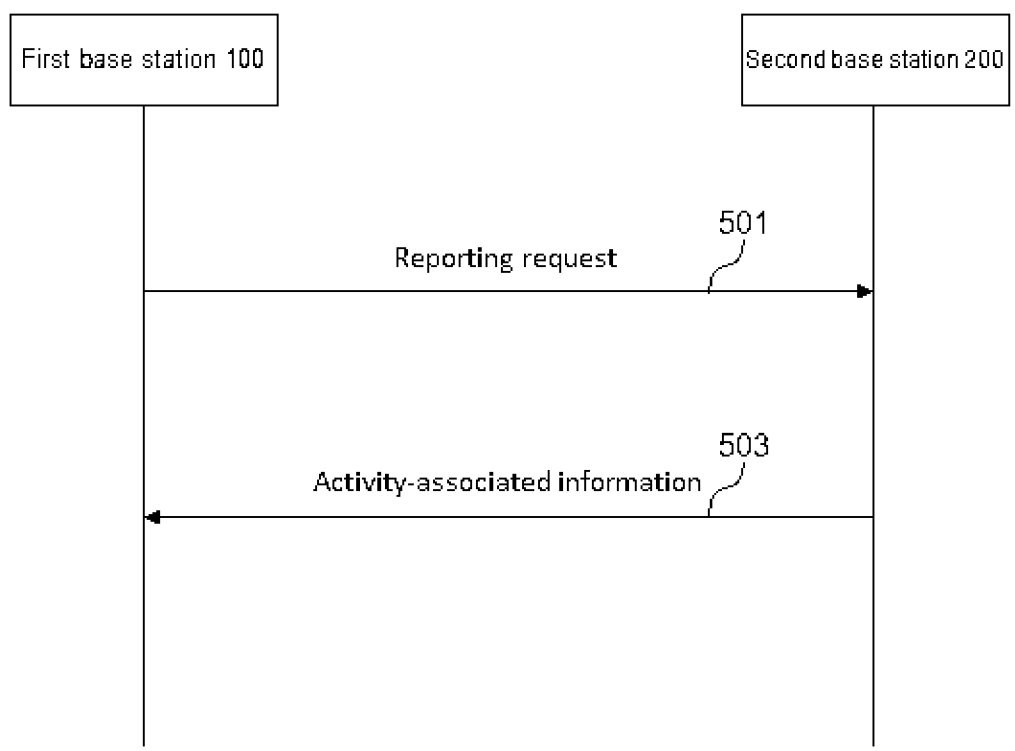
FIG. 25 is a sequence diagram illustrating an example of a schematic flow of request and report processing according to the second example embodiment.

With reference to FIG. 25, request and report processing according to the second example embodiment will be described. FIG. 25 is a sequence diagram illustrating an example of a schematic flow of the request and report processing according to the second example embodiment.

The first base station 100 (request unit 153) that is the master base station requests the second base station 200 that is the secondary base station to report the activity-related information related to the activity of the terminal apparatus 60 in the SCG of the second base station 200 (S501).

The second base station 200 (reporting unit 253) reports the activity-related information to the first base station 100 in response to the request from the first base station 100 (S503). Then, the first base station 100 (information acquiring unit 155) acquires the activity-related information reported by the second base station 200.

Thus, the example embodiments of the present invention have been described. The present invention is not limited to the example embodiments described above, and it is possible to carry out the implementation by modifying in various forms within the scope of the gist of the invention. The above-described example embodiments are illustrative, and it is understood by those skilled in the art that various modifications may be applied to a combination of the example embodiments and a combination of respective constituent components and processing thereof, or such modifications also are within the scope of the present invention.

For example, each step in the processing described herein may not necessarily be performed in chronological manner according to the order described in the sequence diagram. For example, each step in the processing may be performed in an order different from the order described as a sequence diagram, or may be performed in parallel.

Furthermore, a module (e.g., a base station apparatus or a module for the base station apparatus) including the constituent components (e.g., the communication processing unit, the request unit, the information acquisition unit, the control unit, and/or the reporting unit) of the base station described herein may be provided. Furthermore, a method including the processing of the constituent components may be provided, and a program for causing a processor to execute the processing of the constituent components may be provided. Furthermore, a recording medium which records therein the program may be provided. Needless to say, such a module, a method, a program, and a recording medium are also included in the present invention.

Some or all of the above example embodiments can also be described as the following notes, but may not be limited to the following.

(Note 1)

An apparatus comprising:

a communication processing unit configured to communicate with a terminal apparatus over a Master Cell Group (MCG) bearer for dual connectivity of the terminal apparatus;

a request unit configured to request a secondary base station, which communicates with the terminal apparatus over a Secondary Cell Group (SCG) bearer for the dual connectivity, to report activity-related information related to an activity of the terminal apparatus in an SCG of the secondary base station; and an information acquisition unit configured to acquire the activity-related information reported by the secondary base station.

(Note 2)

The apparatus according to note 1, wherein the request unit is configured to provide the secondary base station with type information indicating a type of the report when requesting the secondary base station to report the activity-related information.

(Note 3)

The apparatus according to note 2, wherein the type information indicates, as the type of the report, on-demand, event trigger, or periodic.

(Note 4)

The apparatus according to note 2 or 3, wherein the type information is Report Characteristics Type.

(Note 5)

The apparatus according to any one of notes 1 to 4, wherein the request unit configured to provide the secondary base station with behaviour-related information related to a behaviour of the terminal apparatus when requesting the secondary base station to report the activity-related information.

(Note 6)

The apparatus according to any one of notes 1 to 5, wherein the request unit is configured to provide the secondary base station with timer information indicating a value of an inactivity timer for the terminal apparatus when requesting the secondary base station to report the activity-related information, the timer information being determined based on the behaviour-related information related to the behaviour of the terminal apparatus.

(Note 7)

The apparatus according to note 6, wherein the timer information is User Inactivity Timer.

(Note 8)

The apparatus according to any one of notes 5 to 7, wherein the behaviour-related information is Expected UE Behaviour.

(Note 9)

The apparatus according to any one of notes 1 to 8, wherein the request unit is configured to transmit, to the secondary base station, an SENB ADDITION REQUEST message or an SENB MODIFICATION REQUEST message for requesting a report of the activity-related information.

(Note 10)

The apparatus according to any one of notes 1 to 8, wherein the request unit is configured to transmit, to the secondary base station, a UE-ASSOCIATED INFORMATION REQUEST message for requesting a report of the activity-related information.

(Note 11)

The apparatus according to any one of notes 1 to 10, further comprising: a control unit configured to determine, based on the activity-related information, whether to release the secondary base station.

(Note 12)

The apparatus according to note 11, wherein the control unit is configured to determine, further based on other activity-related information related to an activity of the terminal apparatus in an MCG, whether to release the secondary base station.

(Note 13)

The apparatus according to note 11 or 12, wherein the control unit is configured to release the secondary base station through an SeNB release procedure.

(Note 14)

An apparatus, comprising:

a communication processing unit configured to communicate with a terminal apparatus over an SCG bearer for dual connectivity of the terminal apparatus; and a reporting unit configured to report activity-related information related to an activity of the terminal apparatus in an SCG to a master base station, which communicates with the terminal apparatus over an MCG bearer of the dual connectivity, in response to a request from the master base station.

(Note 15)

The apparatus according to note 14, wherein the reporting unit is configured to report the activity-related information to the master base station based on type information indicating a report type, the type information being provided by the master base station.

(Note 16)

The apparatus according to note 14 or 15, wherein the reporting unit is configured to transmit an SENB MODIFICATION REQUIRED message including the activity-related information to the master base station.

(Note 17)

The apparatus according to note 14 or 15, wherein the reporting unit is configured to transmit a UE ASSOCIATED INFORMATION REPORT message including the activity-related information to the master base station.

(Note 18)

The apparatus according to any one of notes 14 to 17, wherein the reporting unit is configured to provide the master base station with timer information indicating a value of an inactivity timer for the terminal apparatus, the timer information being determined based on behaviour-related information related to a behaviour of the terminal apparatus.

(Note 19)

The apparatus according to note 18, wherein the timer information is User Inactivity Timer.

(Note 20)

The apparatus according to note 18 or 19, wherein the behaviour-related information is information provided by the master base station.

(Note 21)

The apparatus according to any one of notes 1 to 20, wherein the activity-related information is information indicating that the terminal apparatus is inactive in an SCG or information indicating whether the terminal apparatus is active or inactive in an SCG.

(Note 22)

The apparatus according to any one of notes 1 to 21, wherein the activity-related information is User Inactivity Status.

(Note 23)

The apparatus according to any one of notes 1 to 22, wherein the apparatus is a base station, a base station apparatus for the base station, or a module for the base station apparatus.

(Note 24)

A method, comprising the steps of:

communicating, over an MCG bearer for dual connectivity of a terminal apparatus, with the terminal apparatus;

requesting a secondary base station, which communicates with the terminal apparatus over an SCG bearer for the dual connectivity, to report activity-related information related to an activity of the terminal apparatus in an SCG of the secondary base station; and acquiring the activity-related information reported by the secondary base station.

(Note 25)

A method, comprising the steps of:

communicating, over an SCG bearer for dual connectivity of a terminal apparatus, with the terminal apparatus; and reporting, in response to a request from a master base station configured to communicate, over an MCG bearer of the dual connectivity, with the terminal apparatus, activity-related information related to an activity of the terminal apparatus in an SCG, to the master base station.

(Note 26)

A program for causing a processor to execute:

communicating, over an MCG bearer for dual connectivity of a terminal apparatus, with the terminal apparatus;

requesting a secondary base station configured to communicate, over an SCG bearer for the dual connectivity, with the terminal apparatus to report activity-related information related to an activity of the terminal apparatus in an SCG of the secondary base station; and acquiring the activity-related information reported by the secondary base station.

(Note 27)

A program for causing a processor to execute:

communicating, over an SCG bearer for dual connectivity of a terminal apparatus, with the terminal apparatus; and reporting, in response to a request from a master base station configured to communicate, over an MCG bearer of the dual connectivity, with the terminal apparatus, activity-related information related to an activity of the terminal apparatus in an SCG, to the master base station.

(Note 28)

A readable recording medium storing a program for causing a processor to execute:

communicating, over an MCG bearer for dual connectivity of a terminal apparatus, with the terminal apparatus;

requesting a secondary base station configured to communicate, over an SCG bearer for the dual connectivity, with the terminal apparatus to report activity-related information related to an activity of the terminal apparatus in an SCG of the secondary base station; and acquiring the activity-related information reported by the secondary base station.

(Note 29)

A readable recording medium storing a program for causing a processor to execute:

communicating, over an SCG bearer for dual connectivity of a terminal apparatus, with the terminal apparatus; and reporting, in response to a request from a master base station configured to communicate, over an MCG bearer of the dual connectivity, with the terminal apparatus, activity-related information related to an activity of the terminal apparatus in an SCG, to the master base station.

(Note 30)

A system, comprising:

a master base station configured to communicate, over an MCG bearer for dual connectivity of a terminal apparatus, with the terminal apparatus; and a secondary base station configured to communicate, over an SCG bearer for the dual connectivity, with the terminal apparatus, wherein the master base station requests the secondary base station to report activity-related information related to an activity of the terminal apparatus in an SCG of the secondary base station, the secondary base station reports, in response to the request from the master base station, the activity-related information to the master base station, and the master base station acquires the activity-related information reported by the secondary base station.

This application claims priority based on Japanese Patent Application No. 2015-159142, filed on Aug. 11, 2015, the entire disclosure of which is incorporated herein.

REFERENCE SIGNS LIST

1 System
10, 20 Coverage area
30 Control entity
40 Gateway
50 Network
60 Terminal apparatus
100 First base station
141, 151 Communication processing unit
143, 153 request unit
145, 155 Information acquisition unit
147 Control unit
200 Second base station
241, 251 Communication processing unit
243, 255 Reporting unit

What is claimed is:

1. A base station which communicates with a terminal apparatus over a Master Cell Group (MCG) bearer for dual connectivity, the base station comprising:

a transmitter configured to transmit an Addition Request message to a secondary base station which communicates with the terminal apparatus over a Secondary Cell Group (SCG) bearer for the dual connectivity, the Addition Request message including a first information element, an Expected UE Behavior information element, and an inactivity timer, wherein the first information element indicates a request for the secondary base station to report information related to an activity of the terminal apparatus in a Secondary Cell Group (SCG) which is a group of serving cells associated with the secondary base station, wherein the first information element is different from the inactivity timer, and wherein the first information element does not include the inactivity timer; and a receiver configured to receive the information transmitted by the secondary base station.

2. The base station according to claim 1, wherein the information indicates whether the terminal apparatus is inactive or not.

3. The base station according to claim 1, wherein the Addition Request message and a first message are transmitted on a first procedure, the first message being an acknowledge message which corresponds to the Addition Request message, and wherein the information included in a second message is received on a second procedure, the second procedure being different from the first procedure.

4. The base station according to claim 3, wherein the information is transmitted when the activity of the terminal apparatus is changed, if the acknowledge message is transmitted.

5. The base station according to claim 1,
wherein the information is transmitted when the activity of the terminal apparatus is changed.

6. The base station according to claim 1,
wherein the information is transmitted when the activity of the terminal apparatus is changed to be inactive.

7. The base station according to claim 1, wherein the secondary base station sends the information in a case of changing activity state of the terminal apparatus, the information indicating the terminal apparatus is active.

8. A base station which communicates with a terminal apparatus over a Secondary Cell Group (SCG) bearer for dual connectivity, the base station comprising:
a receiver configured to receive an Addition Request message from a master base station which communicates with the terminal apparatus over a Master Cell Group (MCG) bearer for the dual connectivity, the Addition Request message including a first information element, an Expected UE Behavior information element, and an inactivity timer, wherein the first information element indicates a request to report information related to an activity of the terminal apparatus in a Secondary Cell Group (SCG) which is a group of serving cells associated with the base station, wherein the first information element is different from the inactivity timer, and wherein the first information element does not include the inactivity timer; and
a transmitter configured to transmit the information to the master base station.

9. The base station according to claim 8, wherein the information indicates whether the terminal apparatus is inactive or not.

10. The base station according to claim 8,
wherein the Addition Request message and a first message are transmitted on a first procedure, the first message being an acknowledge message which corresponds to the Addition Request message, and
wherein the information included in a second message is received on a second procedure, the second procedure being different from the first procedure.

11. The base station according to claim 8,
wherein the information is transmitted when the activity of the terminal apparatus is changed.

12. The base station according to claim 8,
wherein the information is transmitted when the activity of the terminal apparatus is changed to be inactive.

13. The base station according to claim 8, wherein the base secondary station sends the information in a case of changing activity state of the terminal apparatus, the information indicating the terminal apparatus is active.

14. A method for a base station, the method comprising:
communicating with a terminal apparatus over a Master Cell Group (MCG) bearer for dual connectivity;
transmitting an Addition Request message to a secondary base station which communicates with the terminal apparatus over a Secondary Cell Group (SCG) bearer for the dual connectivity, the Addition Request message separately including a first information element, an Expected UE Behavior information element, and an inactivity timer, wherein the first information element indicates a request for the secondary base station to report information related to an activity of the terminal apparatus in a Secondary Cell Group (SCG) which is a group of serving cells associated with the secondary base station, wherein the first information element is different from the inactivity timer, and wherein the first information element does not include the inactivity timer; and
receiving the information transmitted by the secondary base station.

15. The method according to claim 14, wherein the information indicates whether the terminal apparatus is inactive or not.

16. The method according to claim 14,
wherein the Addition Request message and a first message are transmitted on a first procedure, the first message being an acknowledge message which corresponds to the Addition Request message, and
wherein the information included in a second message is received on a second procedure, the second procedure being different from the first procedure.

17. The method according to claim 16,
wherein the information is transmitted when the activity of the terminal apparatus is changed, if the acknowledge message is transmitted.

18. The method according to claim 14,
wherein the information is transmitted when the activity of the terminal apparatus is changed.

19. The method according to claim 14,
wherein the information is transmitted when the activity of the terminal apparatus is changed to be inactive.

20. The method according to claim 14, transmitting, by the secondary base station, the information in a case of changing activity state of the terminal apparatus, the information indicating the terminal apparatus is active.

* * * * *